(12) United States Patent
Watanabe

(10) Patent No.: US 12,449,357 B2
(45) Date of Patent: Oct. 21, 2025

(54) ESTIMATION SYSTEM, ESTIMATION METHOD, AND RECORDING MEDIUM

(71) Applicant: Evident Corporation, Tatsuno-machi (JP)

(72) Inventor: Satoshi Watanabe, Hinohara-mura (JP)

(73) Assignee: Evident Corporation, Nagano (JP)

( * ) Notice: Subject to any disclaimer, the term of this patent is extended or adjusted under 35 U.S.C. 154(b) by 160 days.

(21) Appl. No.: 18/464,211

(22) Filed: Sep. 9, 2023

(65) Prior Publication Data

US 2023/0417664 A1 Dec. 28, 2023

Related U.S. Application Data

(63) Continuation of application No. PCT/JP2021/010836, filed on Mar. 17, 2021.

(51) Int. Cl.
*G01N 21/45* (2006.01)
*G01N 21/41* (2006.01)
(Continued)

(52) U.S. Cl.
CPC .............. *G01N 21/45* (2013.01); *G01N 21/41* (2013.01); *G01N 21/59* (2013.01); *G02B 21/36* (2013.01)

(58) Field of Classification Search
CPC ........ G01N 21/45; G01N 21/59; G01N 21/41; G01N 2015/1445; G01N 2021/0181; G02B 21/36; G01M 11/0228; G01B 9/02083
See application file for complete search history.

(56) References Cited

U.S. PATENT DOCUMENTS 7,646,490 B2 1/2010 Hill
8,477,297 B2 7/2013 Kato
(Continued)

FOREIGN PATENT DOCUMENTS

JP 2009058926 A 3/2009
JP 2011247692 A 12/2011
(Continued)

OTHER PUBLICATIONS

International Preliminary Report on Patentability (IPRP) (and an English language translation thereof) dated Sep. 28, 2023, issued in International Application No. PCT/JP2021/010836.
(Continued)

*Primary Examiner* — Tarifur R Chowdhury
*Assistant Examiner* — Kaitlyn E Kidwell
(74) *Attorney, Agent, or Firm* — Holtz, Holtz & Volek PC

(57) ABSTRACT

An estimation system has a memory and a processor. The memory stores first wave front information and second wave front information. The first wave front information is information on the wave front that is obtained based on first illumination light that has passed through an object. The second wave front information is information on the wave front that is obtained based on second illumination light that has passed through the object. The wavelength at which the intensity of the second illumination light is highest is shorter than the wavelength at which the intensity of the first illumination light is highest. The processor performs an estimation process of estimating a three-dimensional optical property of the object. The three-dimensional optical property is a refractive index distribution or an absorbance distribution. The estimation process uses both the first wave front information and the second wave front information.

19 Claims, 20 Drawing Sheets

(51) Int. Cl.
*G01N 21/59* (2006.01)
*G02B 21/36* (2006.01)

(56) References Cited

U.S. PATENT DOCUMENTS

| | | | |
|---|---|---|---|
| 8,525,982 | B2 | 9/2013 | Kato |
| 10,073,076 | B2 | 9/2018 | Matsumoto et al. |
| 11,125,686 | B2 | 9/2021 | Shaked |
| 2002/0191193 | A1* | 12/2002 | Smirnov ............... G01N 21/45 356/517 |
| 2008/0030742 | A1 | 2/2008 | Hill |
| 2009/0125242 | A1* | 5/2009 | Choi ..................... G01N 21/51 702/19 |
| 2009/0208072 | A1* | 8/2009 | Seibel ................ G01N 15/1436 382/128 |
| 2011/0292379 | A1 | 12/2011 | Kato |
| 2012/0139136 | A1 | 6/2012 | Kato |
| 2014/0347672 | A1* | 11/2014 | Pavillon ............... G03H 1/0866 356/450 |
| 2017/0082597 | A1 | 3/2017 | Matsumoto et al. |
| 2020/0182788 | A1 | 6/2020 | Shaked |
| 2022/0074854 | A1* | 3/2022 | Suzuki ................ G02B 21/086 |
| 2023/0010572 | A1 | 1/2023 | Ideguchi et al. |
| 2023/0040925 | A1* | 2/2023 | Ahn ....................... G02B 21/18 |

FOREIGN PATENT DOCUMENTS

| | | | |
|---|---|---|---|
| JP | 2012088342 A | 5/2012 | |
| JP | 2012117999 A | 6/2012 | |
| JP | 2013037751 A | 2/2013 | |
| JP | 2015219502 A | 12/2015 | |
| JP | 2019078635 A | 5/2019 | |
| WO | WO-2016199304 A1 * | 12/2016 | |
| WO | 2020013325 A1 | 1/2020 | |
| WO | WO-2021024420 A1 * | 2/2021 | ........... G02B 21/086 |

OTHER PUBLICATIONS

International Search Report (ISR) (and English translation thereof) dated May 18, 2021, issued in International Application No. PCT/JP2021/010836.

Written Opinion dated May 18, 2021, issued in International Application No. PCT/JP2021/010836.

Habaza, et al., "Rapid 3D Refractive-Index Imaging of Live Cells in Suspension without Labeling Using Dielectrophoretic Cell Rotation", Advanced Science, vol. 4, No. 1600205, pp. 1-9, Oct. 21, 2016; DOI: 10.1002/advs. 201600205.

Tian, et al., "3D intensity and phase imaging from light field measurements in LED array microscope", Optica, vol. 2, No. 2; Feb. 2015; pp. 104-111.

* cited by examiner

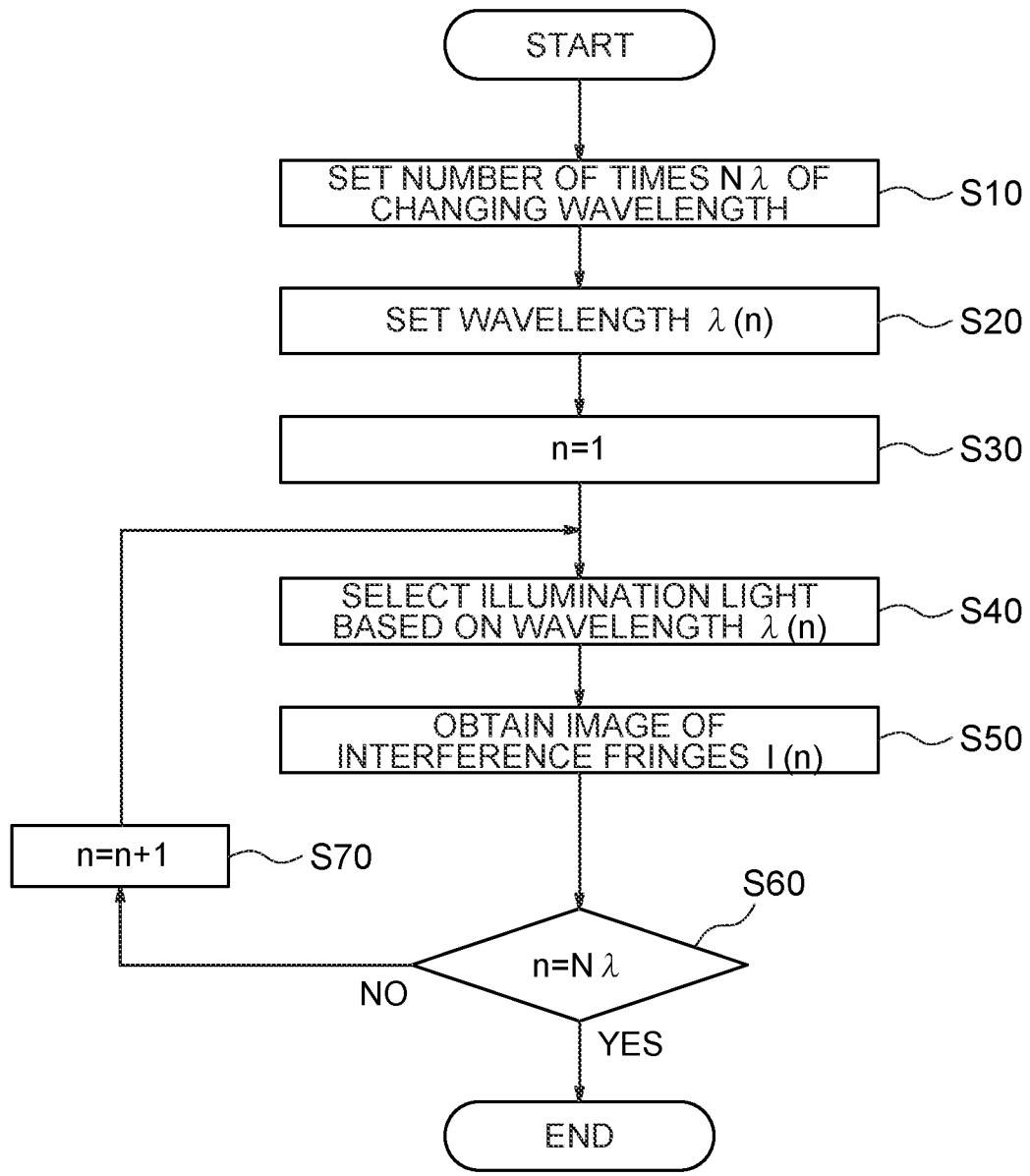

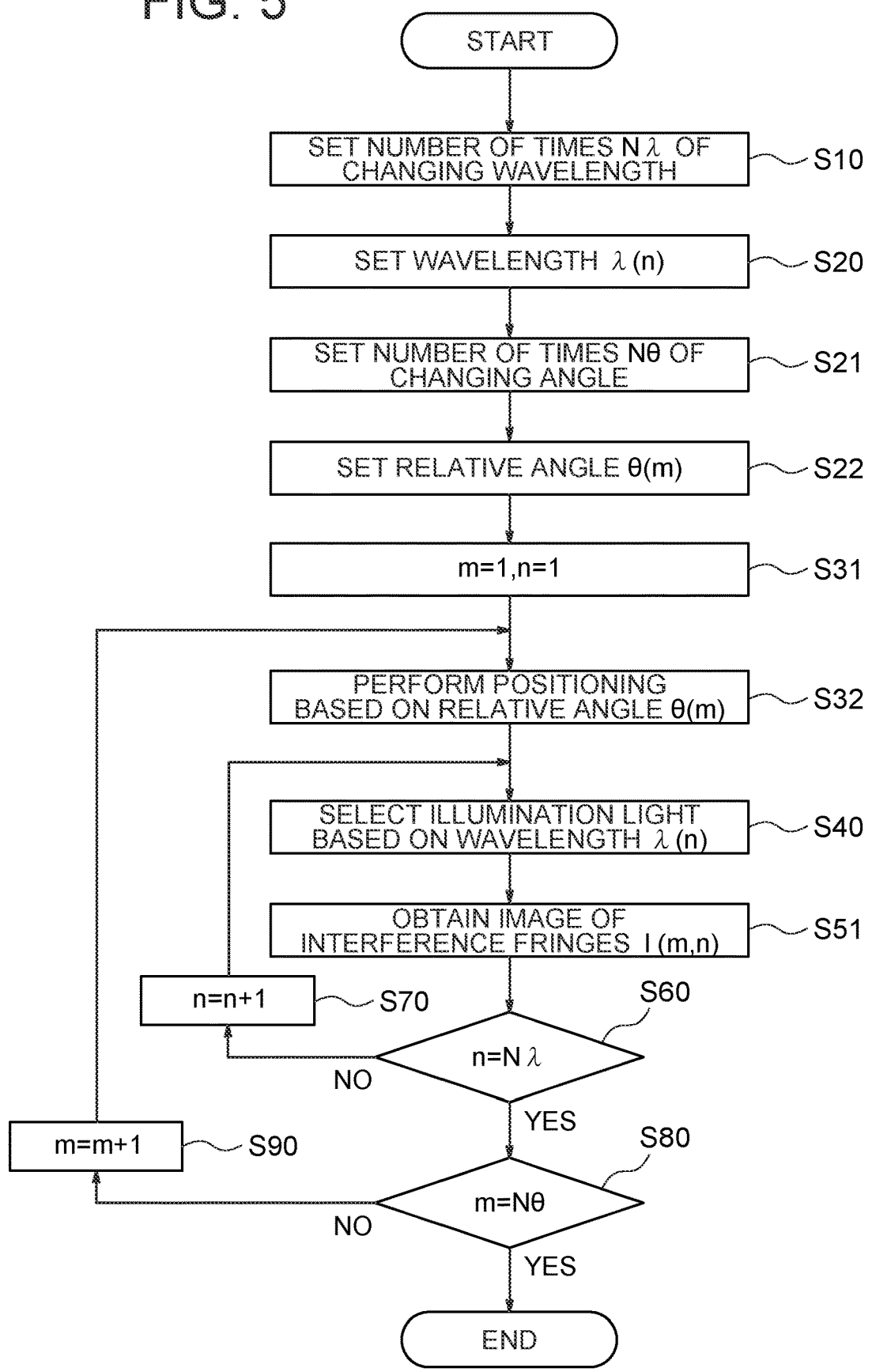

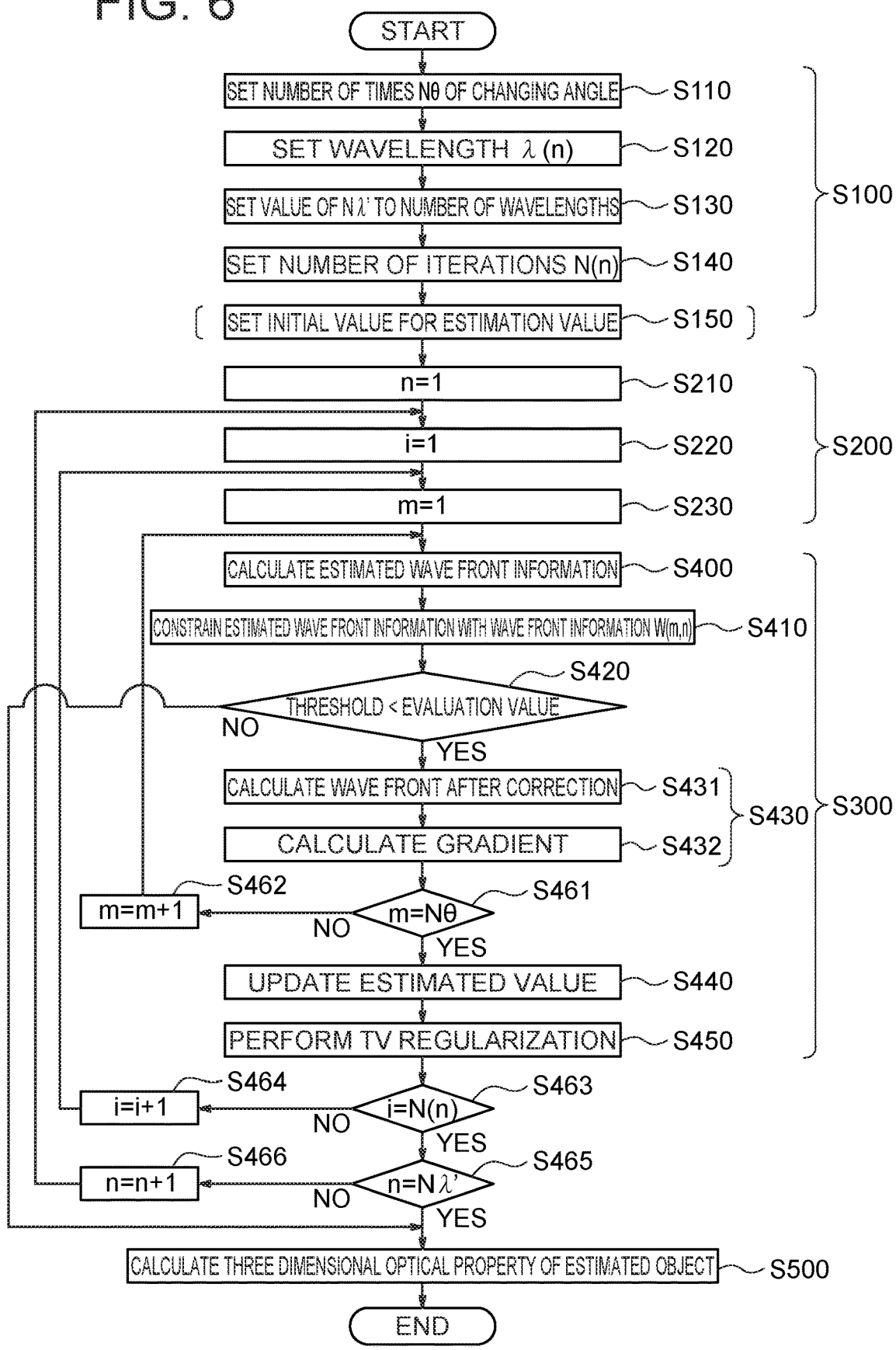

λ=633nm

λ=1300nm

λ1=1300nm, λ2=630nm

NA=0.2, λ=1300nm

NA=0.2, λ1=1300nm, λ2=633nm

NA=0.1, λ=1300nm

NA=0.1, λ1=1300nm, λ2=633nm

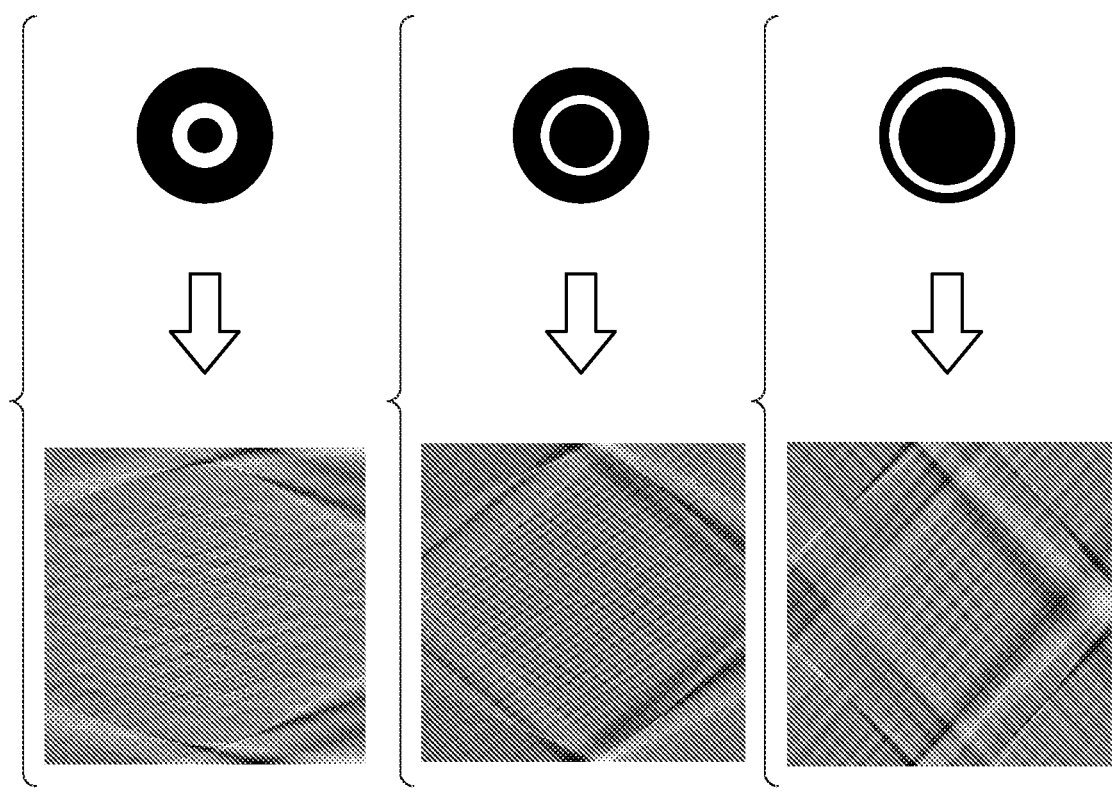

ESTIMATION SYSTEM, ESTIMATION METHOD, AND RECORDING MEDIUM

CROSS REFERENCES

The present application is a continuation application of PCT/JP2021/10836 filed on Mar. 17, 2021; the entire contents of which are incorporated herein by reference.

BACKGROUND OF INVENTION

Technical Field

The present invention relates to an estimation system, an estimation method, and a recording medium.

Description of the Related Art

There is a known reconstruction method to create an object model representing an actual object on a computer. This method utilizes an optimization process to iteratively change or refine the object model on a computer so as to increase alignment of images of the object model with images of the object obtained through measurements. Eventually, when a satisfactory alignment between the images of the object model and the images of the object is achieved, the object model on the computer represents the actual object.

A method of reconstructing an object is disclosed in "3D intensity and phase imaging from light field measurements in an LED array microscope", Optica, 2, 104-111 (2015), which will be referred to as "non-patent literature 1" hereinafter. This method uses an estimation apparatus provided with an LED array. The LED array is disposed at the location of the pupil of the illumination optical system. The locations at which LEDs in the LED array are turned on are changed to illuminate a sample from various angles. Images of the sample are captured at the respective illumination angles, and a plurality of images of the sample is obtained.

Three-dimensional optical properties of an object can be determined through reconstruction of the object. An example of the three-dimensional optical properties is a refractive index distribution or an absorbance distribution.

To determine a three-dimensional optical property of an object with high accuracy and high spatial resolution, it is necessary to reconstruct the object with high accuracy and high spatial resolution.

If an object is reconstructed with high accuracy, it is possible to determine the three-dimensional optical property with high accuracy in both the directions perpendicular to the optical axis and the direction parallel to the optical axis.

SUMMARY

An estimation system according to at least some embodiments of the present invention comprises:
  a memory; and
  a processor,
wherein
  the memory stores first wave front information and second wave front information, the first wave front information being information on the wave front that is obtained based on first illumination light that has passed through an object, the second wave front information being information on the wave front that is obtained based on second illumination light that has passed through the object, and the wavelength at which the intensity of the second illumination light is highest being shorter than the wavelength at which the intensity of the first illumination light is highest, and
  the processor performs an estimation process of estimating a three-dimensional optical property of the object, the three-dimensional optical property being a refractive index distribution or an absorbance distribution, and the estimation process using both the first wave front information and the second wave front information.

An estimation method according to at least some embodiments of the present invention comprises:
  performing an estimation process of estimating a three-dimensional optical property of an object, using both first wave front information and second wave front information, the three-dimensional optical property being a refractive index distribution or an absorbance distribution, the first wave front information being information on a wave front that is obtained based on first illumination light that has passed through the object, the second wave front information being information on a wave front that is obtained based on second illumination light that has passed through the object, and the wavelength at which the intensity of the second illumination light is highest being shorter than the wavelength at which the intensity of the first illumination light is highest.

A recording medium according to at least some embodiments of the present invention is computer-readable recording medium storing a program configured to cause a computer having a memory and a processor to perform an estimation process, wherein
  the estimation process estimates a three-dimensional optical property of an object, the three-dimensional optical property being a refractive index distribution or an absorbance distribution, and
  the program is configured to cause the processor to read out first wave front information and second wave front information from the memory and to perform the estimation process using the first wave front information and the second wave front information, the first wave front information being information on a wave front that is obtained based on first illumination light that has passed through the object, the second wave front information being information on a wave front that is obtained based on second illumination light that has passed through the object, and the wavelength at which the intensity of the second illumination light is highest being shorter than the wavelength at which the intensity of the first illumination light is highest.

BRIEF DESCRIPTION OF THE DRAWINGS

FIG. 2 is a flow chart of a first process of obtaining images of interference fringes;

FIG. 5 is a flow chart of a second process of obtaining images of interference fringes;

FIG. 6 is a flow chart of a first estimation process;

FIGS. 20A, 20B, and 20C show aperture members and images of an object.

DETAILED DESCRIPTION

A problem encountered with the technology disclosed in non-patent literature 1 mentioned above is that it is difficult for the method disclosed in this literature to reconstruct an object having a large thickness with high accuracy and high spatial resolution.

Prior to description of examples of the present invention, the operation and advantageous effects of an embodiment according to a certain mode of the present invention will be described. To describe the operation and advantageous effects of the embodiment specifically, specific exemplary modes will be described. However, the exemplary modes, as well as examples that will be described later, constitute only a portion of the modes encompassed by the present invention, which include many variations. Therefore, it should be understood that the present invention is not limited to the exemplary modes described in the following.

An estimation apparatus according to an embodiment has a memory and a processor. The memory stores first wave front information and second wave front information. The first wave front information is information on the wave front that is obtained based on first illumination light that has passed through an object, and the second wave front information is information on the wave front that is obtained based on second illumination light that has passed through the object. The wavelength at which the intensity of the second illumination light is highest is shorter than the wavelength at which the intensity of the first illumination light is highest. The processor performs the estimation process of estimating a three-dimensional optical property of the object. The three-dimensional optical property is a refractive index distribution or a absorbance distribution. The estimation process uses both the first wave front information and the second wave front information.

Figure 1:
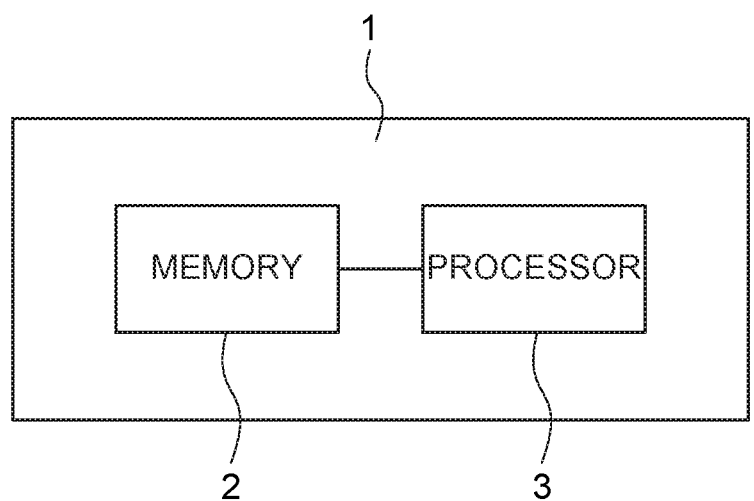
FIG. 1 is a diagram showing an estimation apparatus according to an embodiment.

FIG. 1 is a diagram showing an estimation apparatus according to the embodiment. The estimation apparatus 1 has a memory 2 and a processor 3. The memory 2 stores the first wave front information and the second wave front information. The processor 3 performs the estimation process of estimating a three-dimensional optical property of an object. The three-dimensional optical property is the refractive index distribution or the absorbance distribution. The estimation process may use the first wave front information and the second wave front information.

The processor may be implemented using an ASIC, an FPGA, or a CPU. In the case where the processor is implemented using a CPU, the processor is configured to read out a program from the memory and execute it.

The first wave front information is information on the wave front that is obtained based on the first illumination light that has passed through the object. The second wave front information is information on the wave front that is obtained based on the second illumination light that has passed through the object.

The estimation process uses wave front information. It is preferred that the amount of wave front information be larger. A large amount of wave front information enables the estimation apparatus to estimate the three-dimensional optical property of the object with high accuracy.

The wave front information is obtained based on illumination light that has passed through the object. Therefore, the amount of wave front information depends on the wavelength of the illumination light.

The wave front information includes information on one of the amplitude, phase, light intensity, and complex amplitude. The wave front information is information on the wave front in the image forming plane. The image forming plane is a plane in which light is sensed by a light sensor. The image forming plane is also called imaging plane.

Differences in the wavelength lead to differences in the spatial resolution (which will be simply referred to as "resolution" hereinafter). In this case, differences in the wavelength lead to differences in the number of points that is needed to derive the wave front information. Therefore, a difference in the amount of wave front information can arise in both the direction perpendicular to the optical axis (which will be referred to as the "lateral direction" hereinafter) and the direction parallel to the optical axis (which will be referred to as the "axial direction" hereinafter).

For example, the optical axis mentioned above is the optical axis of the apparatus used to obtain the wave front information. In the case of an apparatus having a sensor optical system, the optical system mentioned above is the optical axis of the sensor optical system.

Differences in the wavelength lead to differences in the degree of diffusion of illumination light. This leads to differences in the reachable location of illumination light inside the object. Therefore, there will be differences in the amount of wave front information with respect to the axial direction.

When the thickness of the object is large, changes in the illumination light that occur while it passes through the object is large. Since the phase information is folded within the range between $-\pi$ and $\pi$, the wave front information contains an uncertainty value equal to an integral multiple of $2\pi$, which can place a restriction on the amount of wave front information. Since changes in the phase due to passing through the object depend on the wavelength, the restriction on the amount of wave front information also depends on the wavelength.

The resolution is lower when the wavelength of the illumination light is long than when it is short. Therefore, the amount of wave front information that can be obtained is smaller when the wavelength of the illumination light is long than when it is short with respect to both the lateral and axial directions. The illumination light reaches the deeper interior of the object in the axial direction when the wavelength of the illumination light is long than when it is short.

In the case where the thickness of the object is large, an uncertainty equal to an integral multiple of $2\pi$ and a restriction on the amount of wave front information are less likely to occur when the wavelength of the illumination light is long than when it is short. Therefore, the amount of wave front information with respect to the axial direction obtained using illumination light having a long wavelength is larger than that obtained using illumination light having a short wavelength.

When the wavelength of the illumination light is long, while the amount of wave front information is small in terms of resolution, but large in terms of the reach of the illumination light respect to the axial direction. Overall, the amount of wave front information with respect to the axial direction is larger when the wavelength of the illumination is long than when it is short.

The resolution is higher when the wavelength of the illumination light is short than when it is long. Therefore, the amount of wave front information that can be obtained is larger when the wavelength of the illumination light is short than when it is long with respect to both the lateral and axial directions. The illumination light does not reach the deeper interior of the object in the axial direction when the wavelength of the illumination light is short than when it is long. Therefore, the amount of wave front information that can be obtained with respect to the axial direction is smaller when the wavelength of the illumination light is short than when it is long.

When the wavelength of the illumination light is short, the amount of wave front information tend to be large in terms of resolution, but small in terms of the reach of the illumination light with respect to the axial direction. Overall, the amount of wave front information with respect to the axial direction is smaller when the wavelength of the illumination light is short than when it is long.

The shorter the wavelength of the illumination light used to obtain wave front information is, the smaller the amount of information obtained with respect to the axial direction is. Therefore, when the wavelength of the illumination light is short, the accuracy of estimation will be relatively low with respect to the axial direction.

To prevent a decrease in the accuracy of estimation with respect to the axial direction, it is preferred that wave front information obtained with illumination light having a long wavelength be used. However, longer wavelengths of the illumination light lead to larger diffraction angles, which in turn lead to lower resolutions.

To prevent a decrease in the resolution, it is preferred to increase the numerical aperture of the optical system. However, increasing the numerical aperture makes the field of view smaller and the working distance shorter. For this reason, it will be difficult to obtain wave front information needed for estimation with respect to the horizontal direction, when the thickness of the object is large.

For the above reason, in the case where the thickness of the object is large, if the three-dimensional optical property of the object is estimated using only wave front information that is obtained at a single wavelength, it is difficult to determine the three-dimensional optical property of the object with high accuracy and high spatial resolution.

The estimation apparatus 1 estimates the three-dimensional optical property of the object using wave front information that is obtained at two wavelengths. The wavelength band of the first illumination light is different from the wavelength band of the second illumination light. The wavelength at which the intensity of the second illumination light is highest is shorter than the wavelength at which the intensity of the first illumination light is highest. In consequence, it is possible to increase the amount of wave front information. As a result, it is possible to determine the three-dimensional optical property of the object with high accuracy and high spatial resolution.

The highest intensity is the highest value of the peaks (local maximum values). There are multiple peaks in some cases. As the light sources of the first illumination light and the second illumination light, lasers or quasi-monochromatic LEDs may be used. As the first and second illumination light, a single wavelength light or light that can be regarded as a single wavelength light in optical calculation may be used. As the first and second illumination light, light having a narrow wavelength bandwidth may be used. It is preferred that the half value width of the first and second illumination light be equal to or smaller than 50 nm.

For example, the wave front information can be obtained from interference fringes. The interference fringes are formed by measurement light and reference light. The measurement light is light that has passed through the object. The reference light is light that has not passed through the object. The illumination light used is parallel light.

In the case where the wave front is estimated based on the light intensity, an image may be used as the wave front information. In the case where an image is used as the wave front information, it is not necessary to analyze the image to obtain the wave front information.

The wave front information can be obtained by analyzing images of interference fringes. Therefore, it is necessary to obtain images of interference fringes. In the following, a process of obtaining images of interference fringes will be described.

FIG. 2 is a flow chart of a first process of obtaining images of interference fringes. In the first obtaining process, the wavelength of the illumination light is varied.

In step S10, the number of times NA of changing the wavelength is set. For example, in the case where the wavelength of the illumination light is changed three times, the value of the number of times NA of changing the wavelength is set to 3. The number of times NA of changing the wavelength is not limited to 3, but it may be any number equal to or greater than 2.

In step S20, the wavelength $\lambda(n)$ is set. In this step of setting the wavelength $\lambda(n)$, the wavelength $\lambda(n)$ is set such that the wavelength is made shorter as the value of variable n increases. In this case, the value of $\lambda(1)$ is set to the longest wavelength.

For example, the value of $\lambda(1)$ is set to 1500 nm, the value of $\lambda(2)$ is set to 650 nm, and the value of $\lambda(3)$ is set to 480 nm. These wavelengths 1500 nm, 650 nm, and 480 nm are wavelengths at the highest intensity. While the unit "nm" is mentioned as the unit of wavelength in this description, only the numerical values are set in the actual process.

The wavelength $\lambda(n)$ may be set such that the wavelength is made longer as the value of variable n increases. Alternatively, the wavelength $\lambda(n)$ may be set such that the relationship between the wavelength and the value of variable n is random. The random setting can be achieved by preparing a table that defines the relationship beforehand.

In step S30, the value of variable n is set to 1.

In step S40, the illumination light is selected based on the value of the wavelength $\lambda(n)$. In the case where the wavelength of the light emitted from a light source is a single wavelength, a light source that emits light of a wavelength equal to the value of the wavelength $\lambda(n)$ is selected. The light source may be a laser.

In the case where the light emitted from a light source has multiple wavelengths, an optical filter may be used to select one wavelength. In this case, an optical filter that transmits light of a wavelength equal to the value of the wavelength $\lambda(n)$ is selected.

In step S50, an image of interference fringes I(n) is obtained. The interference fringes I(n) are formed when the object is illuminated with the illumination light. An image of the interference fringes I(n) can be obtained by imaging the interference fringes I(n) using a light sensor.

The values of variable n are ordinal numbers related to the wavelength. The interference fringes I(n) represents the interference fringes formed with the illumination light of the n-th wavelength.

As described above, in the exemplary case described here, the wavelength is set such that the wavelength is made shorter as the value of variable n increases. Therefore, as the value of variable n increases, the wavelength of the illumination light used to form the interference fringes I(n) is made shorter.

In step S60, it is determined whether or not the value of variable n is equal to the number of times N$\lambda$ of changing the wavelength. If the result of the determination is NO (negative), the processing of step S70 is performed next. If the result of determination is YES (affirmative), the process is ended.

If the result of the determination in step S60 is NO (i.e., n≠N$\lambda$), the processing S70 is performed. In step S70, the value of variable n is incremented by 1. After the completion of step S70, the process returns to step S40. Since the value of variable n was incremented by 1 in step S70, the processing of step S50 is performed using illumination light of another wavelength. The processing of step S50 is repeatedly executed until the illumination light has been changed across all the predefined wavelengths.

If the result of the determination in step S60 is YES (i.e., n=N$\lambda$), the process of obtaining images of the interference fringes is ended. The processing of obtaining an image of the interference fringes is performed N$\lambda$ time, and N$\lambda$ images of the interference fringes are obtained. In the above-described case, the number of times N$\lambda$ of changing the wavelength is set to 3, and three images of the interference fringes are obtained.

The wave front information can be obtained from interference fringes. The wave front information obtained from interference fringes I(n) will be expressed as wave front information W(n).

The wavelength of the second illumination light is shorter than the wavelength of the first illumination light. The longest wavelength in the wavelength band of the second illumination light is shorter than the shortest wavelength in the wavelength band of the first illumination light.

In the case described above, the values of $\lambda(1)$, $\lambda(2)$, and $\lambda(3)$ are set to 1500 nm, 650 nm, and 480 nm respectively. The first illumination light corresponds to the illumination light having a wavelength of $\lambda(1)$, and the second illumination light corresponds to the illumination light having a wavelength of $\lambda(2)$ or $\lambda(3)$. Alternatively, the first illumination light corresponds to the illumination light having a wavelength of $\lambda(2)$, and the second illumination light corresponds to the illumination light having a wavelength of $\lambda(3)$.

N$\lambda$ images of interference fringes include first and second images. The first image is an image of the interference fringes that are formed with the first illumination light. The second image is an image of the interference fringes that are formed with the second illumination light.

The wave front information W(n) includes the first wave front information and the second wave front information. The wave front information W(n) is stored in the memory 2. The value of the wavelength $\lambda(n)$ is also stored in the memory 2.

As above, the processor 3 performs the estimation process of estimating the three-dimensional optical property of the object. In the estimation process, the processor 3 estimates the three-dimensional optical property of the object using both the first wave front information and the second wave front information.

In the estimation apparatus according to the embodiment, it is preferred that the memory store multiple pieces of first wave front information and multiple pieces of second wave front information, the multiple pieces of first wave front information be different from each other in terms of the angle of incidence of the first illumination light on the object, the multiple pieces of second wave front information be different from each other in terms of the angle of incidence of the second illumination light on the object, and both the multiple pieces of first wave front information and the multiple pieces of second wave front information be used in the estimation process.

The estimation process uses both the multiple pieces of first wave front information and the multiple pieces of second wave front information. For this purpose, the memory stores the multiple pieces of first wave front information and the multiple pieces of second wave front information.

The first wave front information is wave front information that is obtained based on the first illumination light that has passed through the object. The angle of incidence of the first illumination light on the object differs among the multiple pieces of first wave front information.

Figure 3A:
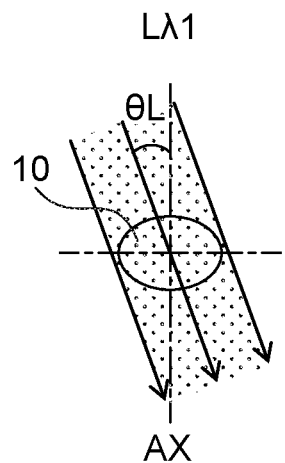
FIGS. 3A, 3B, 3C, 3D, 3E, and 3F are diagrams showing how the first illumination light passes through an object.
Figure 3B:
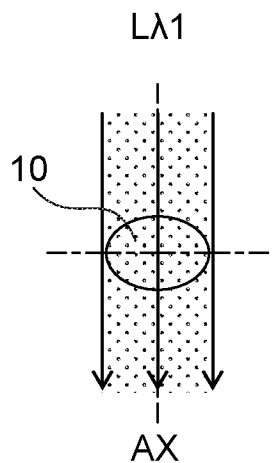
Figure 3C:
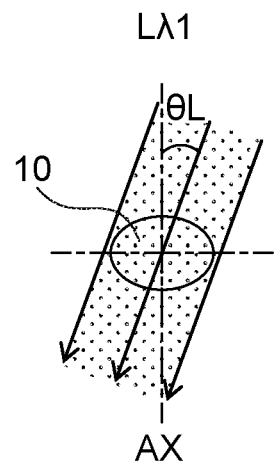
Figure 3D:
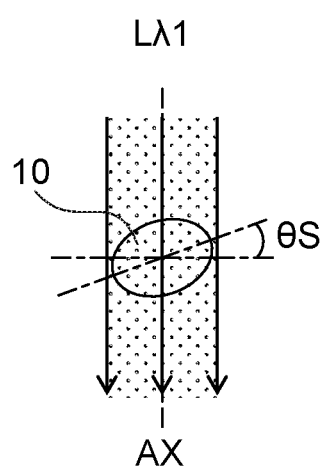
Figure 3E:
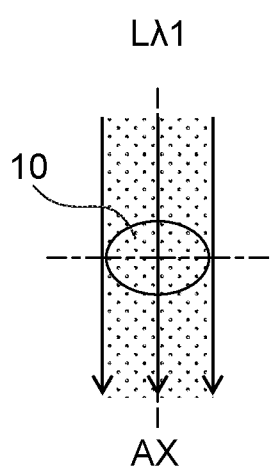
Figure 3F:
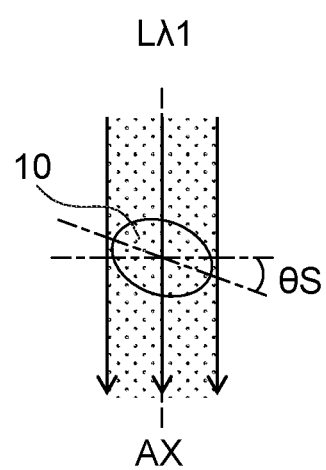

FIGS. 3A through 3F show how the first illumination light passes through the object. FIGS. 3A, 3B, and 3C show changes in the direction of illumination with the first illumination light. FIGS. 3D, 3E, and 3F show changes in the orientation of the object.

In FIGS. 3A, 3B, and 3C, the direction of illumination with the first illumination light L$\lambda$1 is changed without changing the orientation of the object 10. In consequence, the angle of incidence of the first illumination light L$\lambda$1 on the object 10 changes. The angle $\theta$L in FIGS. 3A, 3B, and 3C is the angle formed by the first illumination light L$\lambda$1 and the optical axis AX. The value of the angle $\theta$L is −20° in FIG. 3A, 0° in FIG. 3B, and +20° in FIG. 3C.

In the case shown in FIGS. 3D, 3E, and 3F, the direction of illumination with the first illumination light L$\lambda$1 is not changed, but the orientation of the object 10 is changed. In consequence, the orientation of the object 10 relative to the first illumination light L$\lambda$1 changes. The angle $\theta$S in FIGS. 3D, 3E, and 3F is the inclination angle of the object. The value of the angle $\theta$S is −20° in FIG. 3D, 0° in FIG. 3E, and +20° in FIG. 3F.

The direction of illumination with the first illumination light L$\lambda$1 does not change in the case shown in FIGS. 3D, 3E, and 3F. Therefore, the angle of incidence of the first illumination light L$\lambda$1 on the object 10 appears not to change. However, since the orientation of the object 10 is changed, the angle of incidence of the first illumination light L$\lambda$1 on the object 10 changes actually.

The second wave front information is wave front information that is obtained based on the second illumination light that has passed through the object. The angle of incidence of the second illumination light on the object differs among the multiple pieces of second wave front information.

Figure 4A:
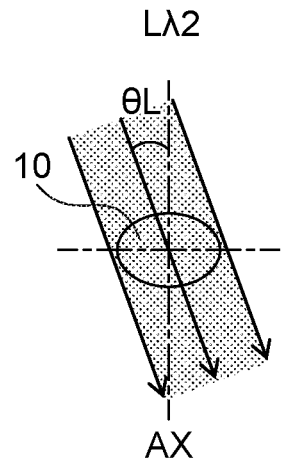
FIGS. 4A, 4B, 4C, 4D, 4E, and 4F are diagrams showing how the second illumination light passes through the object.
Figure 4B:
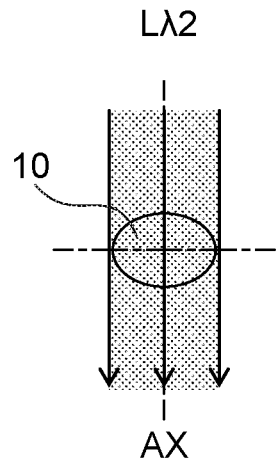
Figure 4C:
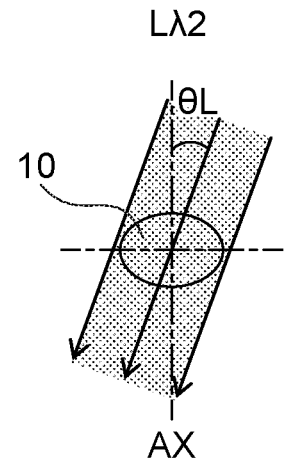
Figure 4D:
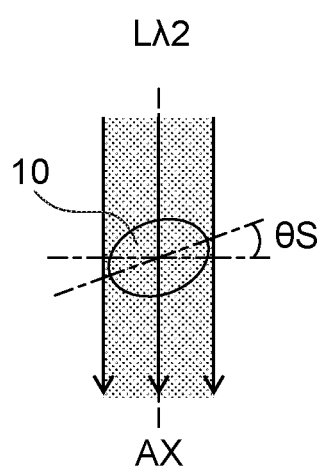
Figure 4E:
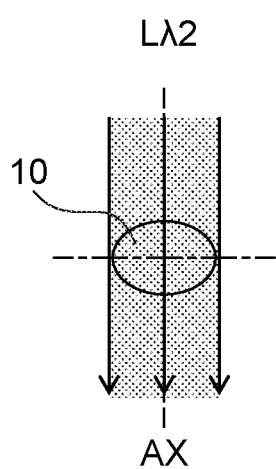
Figure 4F:
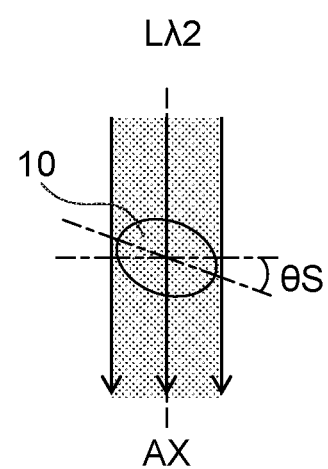

FIGS. 4A through 4F show how the second illumination light passes through the object. FIGS. 4A, 4B, and 4C show changes in the direction of illumination with the second illumination light. FIGS. 4D, 4E, and 4F show changes in the orientation of the object.

In FIGS. 4A, 4B, and 4C, the direction of illumination with the second illumination light Lλ2 is changed without changing the orientation of the object 10. In consequence, the angle of incidence of the second illumination light Lλ2 on the object 10 changes. The angle θL in FIGS. 4A, 4B, and 4C is the angle formed by the second illumination light Lλ2 and the optical axis AX. The value of the angle θL is −20° in FIG. 4A, 0° in FIG. 4B, and +20° in FIG. 4C.

In the case shown in FIGS. 4D, 4E, and 4F, the direction of illumination with the second illumination light Lλ2 is not changed, but the orientation of the object 10 is changed. In consequence, the orientation of the object 10 relative to the second illumination light Lλ2 changes. The angle θS in FIGS. 4D, 4E, and 4F is the inclination angle of the object. The value of the angle θS is −20° in FIG. 4D, 0° in FIG. 4E, and +20° in FIG. 4F.

The direction of illumination with the second illumination light Lλ2 does not change in the case shown in FIGS. 4D, 4E, and 4F. Therefore, the angle of incidence of the second illumination light Lλ2 on the object 10 appears not to change. However, since the orientation of the object 10 is changed, the angle of incidence of the second illumination light Lλ2 on the object 10 changes actually.

The angle of incidence of the illumination light on the object can be replaced by the relative orientation of the illumination light and the object. The relative orientation will be hereinafter referred to as the "relative direction".

As described above, the wave front information is obtained based on the illumination light that has passed through the object. Therefore, the amount of the wave front information depends on the relative direction.

As the relative angle is changed, the wave front information can be obtained multiple times as many times as the number of times the relative angle is changed. In this way, the amount of the wave front information can be increased. Moreover, when the relative angle is varied, the regions inside the object through which the illumination light passes also vary. The wave front information obtained at one relative direction includes information that is not included in the wave front information obtained at another relative direction. Therefore, it is possible to increase the amount of the wave front information.

With respect to the multiple pieces of first wave front information, the angle of incidence of the first illumination light on the object differs among the multiple pieces of first wave front information. With respect to the multiple pieces of second wave front information, the angle of incidence of the second illumination light on the object differs among the multiple pieces of second wave front information. Thus, it is possible to increase the amount of the wave front information. As a result, it is possible to determine the three-dimensional optical property of the object with high accuracy and high spatial resolution.

FIG. 5 is a flow chart of a second process of obtaining images of interference fringes. The processing steps that are the same as the corresponding steps in FIG. 2 are denoted by the same step numbers and will not be described in further detail. In the second obtaining process, the wavelength of the illumination light and the relative direction are varied.

In step S21, the number of times NO of changing the angle is set. The angle that varied is the relative direction. For example, when in the case where the relative direction is changed five times, the value of the number times NO of changing the angle is set to 5.

The difference of the relative directions is expressed by an angle. In the following, the difference of the relative directions is expressed by a relative angle θ(m). When the relative directions of the illumination light and the object coincide with each other, the difference in the relative directions is 0°. Then, the value of the relative angle θ(m) is set to 0°.

In step S22, the relative angle θ(m) is set. For example, in the step of setting the relative angle θ(m), the value of θ(1) is set to 0°, the value of θ(2) is set to 4°, the value of θ(3) is set to 7°, the value of θ(4) is set to 10°, and the value of θ(5) is set to 15°.

Alternatively, an initial value and an increment may be set. In this case, the value of θ(1) may be set to the initial value, and the values of θ(2), θ(3), θ(4), and θ(5) may be set to values calculated by successively adding the increment to the initial value.

While the unit "°" is added in the description, only the numerical values are set in the actual process.

In step S31, the value of variable m and the value of variable n are set to 1.

In step S32, the positioning based on the relative angle θ(m) is performed. What is positioned in this step is the illumination light or the object. In this positioning process, the direction of the illumination light is changed such that the angle formed between the illumination light and the optical axis becomes equal to the value of the relative angle θ(m). Alternatively, the object is rotated such that the orientation of the object relative to the illumination light matches the value of the relative angle θ(m).

In step S51, an image of interference fringes I(m, n) is obtained. The interference fringes I(m, n) are formed when the object is illuminated with the illumination light. An image of the interference fringes I(m, n) can be obtained by imaging the interference fringes I(m, n) using a light sensor.

The values of variable m are ordinal numbers related to the relative angle. The values of variable n are ordinal numbers related to the wavelength. The interference fringes I(m, n) are the interference fringes that are formed at m-th relative angle and the n-th wavelength.

For example, as described above, the wavelength λ(n) may be set such that the wavelength is made shorter as the value of variable n increases. In this case, as the value of variable n increases, the wavelength of the illumination light used to form the interference fringes I(m, n) is made shorter.

Alternatively, in the case where the wavelength λ(n) is set such that the wavelength is made longer as the value of variable n increases, the wavelength of the illumination light used to form the interference fringes I(m, n) is made longer, as the value of variable n increases.

In step S60, it is determined whether or not the value of variable n is equal to the value of the number of times Nλ of changing the wavelength. If the result of the determination is NO (negative), the processing of step S40 is performed next. If the result of the determination is YES (affirmative), the processing of step S80 is performed next.

If the result of the determination in step S60 is YES (i.e., n=Nλ), the processing of step S80 is performed. In step S80, it is determined whether the value of variable m is equal to the value of the number of times NO of changing the angle. If the result of the determination is NO (negative), the processing of step S90 is performed next. If the result of the determination is YES (affirmative), this process is ended.

If the result of the determination in step S80 is NO (i.e., n≠Nθ), the processing of step S90 is performed. In step S90, the value of variable m is incremented by 1. After the completion of step S90, the process returns to step S32. Since the value of variable m was incremented by 1 in step S90, the processing of steps S40 and S51 is performed at another relative angle. The processing of steps S40 and S51 is repeatedly executed until the positioning has been performed at all the predefined wavelengths.

If the result of the determination in step S80 is YES (i.e., n=Nθ), the process of obtaining images of interference fringes is ended. An image of the interference fringes is obtained (Nλ×Nθ) times. Therefore, (Nλ×Nθ) images of interference fringes are obtained. In the exemplary case described above, the number of times NO of changing the angle is set to 5, and the number of times Nλ of changing the wavelength is set to 3. Therefore, fifteen images of interference fringes are obtained.

Wave front information can be obtained from interference fringes. The wave front information obtained from the interference fringes I(m, n) will be referred to as the wave front information W(m, n).

The wavelength of the second illumination light is shorter than the wavelength of the first illumination light. In the case described above, the value of the wavelength λ(1) is set to 1500 nm, the value of the wavelength λ(2) is set to 650 nm, and the value of the wavelength λ(3) is set to 480 nm. Therefore, the illumination light of the wavelength λ(1) corresponds to the first illumination light, and the illumination light of the wavelength λ(2) or λ(3) corresponds to the second illumination light. Alternatively, the illumination light of the wavelength λ(2) corresponds to the first illumination light, and the illumination light of the wavelength λ(3) corresponds to the second illumination light.

The (Nλ×Nθ) images of interference fringes include a plurality of first images and a plurality of second images. The first images are images of interference fringes that are formed with the first illumination light. The second images are images of interference fringes that are formed with the second illumination light.

The plurality of first images includes images of interference fringes that are formed at difference angles of incidence of the first illumination light on the object. Therefore, a plurality of pieces of first wave front information can be obtained from the plurality of first images. The plurality of second images includes images of interference fringes that are formed at difference angles of incidence of the second illumination light on the object. Therefore, a plurality of pieces of second wave front information can be obtained from the plurality of second images.

The wave front information W(m, n) includes a plurality of pieces of first wave front information and a plurality of pieces of second wave front information. The wave front information is stored in the memory 2. The values of the number of times NO of changing the angle, the values of the relative angles θ(m), and the values of the wavelength λ(n) are also stored in the memory 2.

As described above, the processor 3 performs the estimation process of estimating the three-dimensional optical property of the object. In the estimation process, the processor estimates the three-dimensional optical property of the object using both the plurality of pieces of first wave front information and the plurality of pieces of second wave front information.

In the second obtaining process, interference fringes formed with the first illumination light and interference fringes formed with the second illumination light are obtained at one relative angle. However, interference fringes formed with the first illumination light may be obtained first at all the relative angles, and then interference fringes formed with the second illumination light may be obtained at all the relative angles.

The estimation process performed by the estimation apparatus according to the embodiment includes a first optimization process that uses the first wave front information as a constraint, and a second optimization process that uses the second wave front information as a constraint. It is preferred that the processor be configured to iteratively perform the second optimization process on the three-dimensional optical property that has been refined by the first optimization process that has been performed consecutively.

The estimation of the three-dimensional optical property of the object uses the wave front information. To obtain the wave front information, it is necessary to determine the wave front that has passed through the object. The estimation apparatus according to the embodiment determines the wave front using the beam propagation method. Alternatively, the FDTD (Finite Difference Time Domain) may be used instead of the beam propagation method.

The second wave front information is information obtained with the second illumination light. The wavelength band of the second illumination light spreads over wavelengths shorter than wavelengths through the wavelength band of the first illumination light. Therefore, the three-dimensional optical property can be estimated based on the second wave front information with high accuracy with respect to the lateral direction, but cannot be estimated even roughly with respect to the axial direction.

The first wave front information is information obtained with the first illumination light. The wavelength band of the first illumination light spreads over wavelengths longer than wavelengths through the wavelength band of the second illumination light. Therefore, the three-dimensional optical property can be estimated roughly based on the first wave front information not only with respect to the lateral direction but also with respect to the axial direction.

In view of the above, the estimation apparatus according to the embodiment roughly estimates the three-dimensional optical property with respect to all the directions using the first wave front information first. After rough estimation is done, the estimation apparatus estimates the three-dimensional optical property with high accuracy using the second wave front information. Through estimations done in the above order, the estimation apparatus can determine the three-dimensional optical property of the object efficiently with high accuracy and high spatial resolution.

FIG. 6 is a flow chart of a first estimation process. The first estimation process includes steps S100, S200, S300, S400, and S500.

In step S100, various setting is performed.

Step S100 includes steps S110, S120, S130, and S140. Step S100 may further include step S150 when necessary.

In step S110, the number of times NO of changing the angle is set. The value of the number of times NO of changing the angle is stored in the memory 2. In this step, the number of times NO of changing the angle is set to the value stored in the memory 2. For example, when the value stored in the memory 2 is 5, the number of times NO of changing the angle is set to 5.

In step S120, the wavelength λ(n) is set. The values of the wavelength λ(n) are stored in the memory 2. As the values of the wavelengths to be used are set beforehand, the process can proceed without displaying the values.

All the values of the wavelength λ(n) may be read out from the memory 2 and displayed. For example, when the values 1500 nm, 650 nm, and 480 nm are stored in the memory 2, these values may be displayed. The displayed values represent wavelengths. Two or more wavelengths to be used for estimation may be selected from the displayed wavelengths.

For example, the selected values of the wavelength λ(n) are set such that the wavelength is made shorter as the value of variable n increases. In this case the value of the wavelength λ(1) is set to the value of the wavelength at which the intensity is highest.

For example, if the selected values are 1500 nm, 650 nm, and 480 nm, the values of the wavelength λ(n) are set as follows.

λ(1)=1500 nm
λ(2)=650 nm
λ(3)=480 nm

In step S130, the value of variable Nλ' is set to the number of wavelengths. The number of wavelengths is the number of the wavelengths selected as above. Selecting the wavelengths to be used for estimation determines the number of selected wavelengths. The value of variable Nλ' is set to the number of selected wavelengths. In the above case, the number of selected wavelength is three, and therefore the value of the number of wavelengths Nλ' is set to 3. The number of wavelengths selected here may be two or more.

In step S140, the number of iterations N(n) is set. The number of iteration N(n) is the number of times of performing the optimization process. The optimization process includes the first optimization process and the second optimization process. The first and second optimization processes will be described in detail later.

The number of iterations N(n) and the wavelength λ(n) use variable n. This means that the number of iterations N(n) is set for each of the values (or wavelengths) set for the wavelength λ(n).

In the above case, the number of selected wavelengths is 3. For example, the values of the number of iterations N(n) are set as follows.

N(1)=3
N(2)=2
N(3)=2

In the case where the estimation process includes step S150, an initial value is set for the estimation value in step S150. The estimation value is the value of the three-dimensional optical property of the estimated object. The estimation of the three-dimensional optical property is performed by simulation. The simulation is performed using an estimated object. Setting an initial value for the estimated value enables the simulation.

In step S200, various initialization is performed.

Step S200 include steps S210, S220, and S230.

In step S210, the value of variable n is set to 1. In step S220, the value of variable i is set to 1. In step S230, the value of variable m is set to 1.

In step S300, an estimation process is performed. The estimation process is the process of estimating the three-dimensional optical property of the object.

Step S300 includes steps S400, S410, S420, S430, S440, and S450.

For example, the estimation process uses an evaluation value. The evaluation value is represented by the difference or the ratio between wave front information of the measurement light and wave front information obtained by simulation. For example, the wave front information contains information on one of the amplitude, phase, light intensity, and complex amplitude.

The wave front information obtained by simulation (which will be referred to as the "estimated wave front information" hereinafter) is calculated from an estimated image. The estimated image is an image obtained from light that has transmitted through an estimated object. The light that has transmitted through the estimated object is simulated light. The wave front information of measurement light (which will be referred to as the "measured wave front information" hereinafter) is calculated from a measured image.

The measured image is an image of the object captured by an optical device. The estimated image is an image of the estimated object obtained by simulation.

Figure 7A:
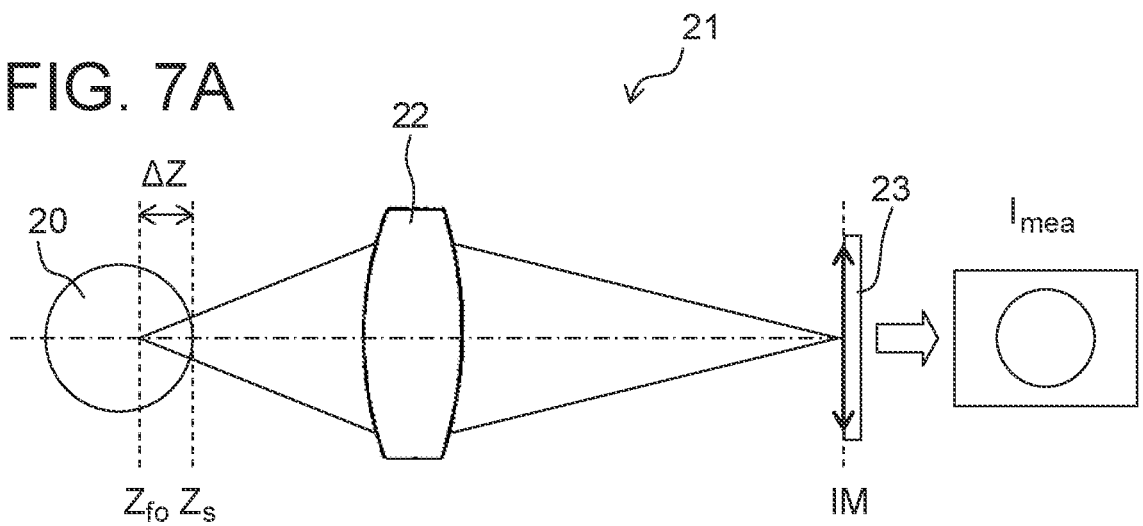
FIGS. 7A, 7B, and 7C are diagrams illustrating a measured image and an estimated image.
Figure 7B:
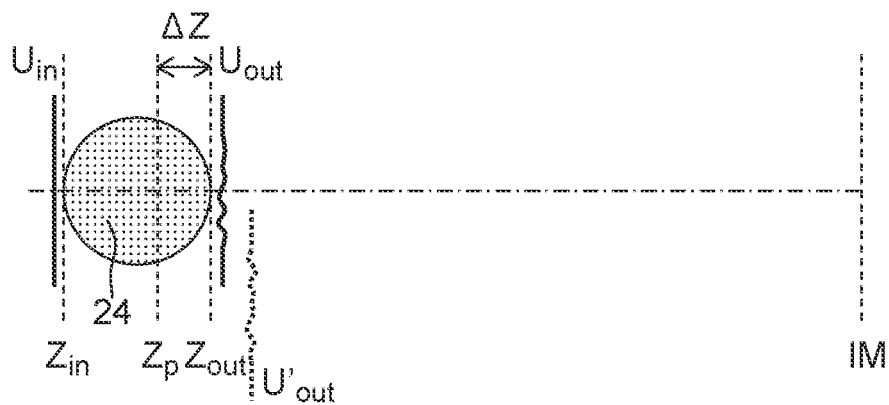
Figure 7C:
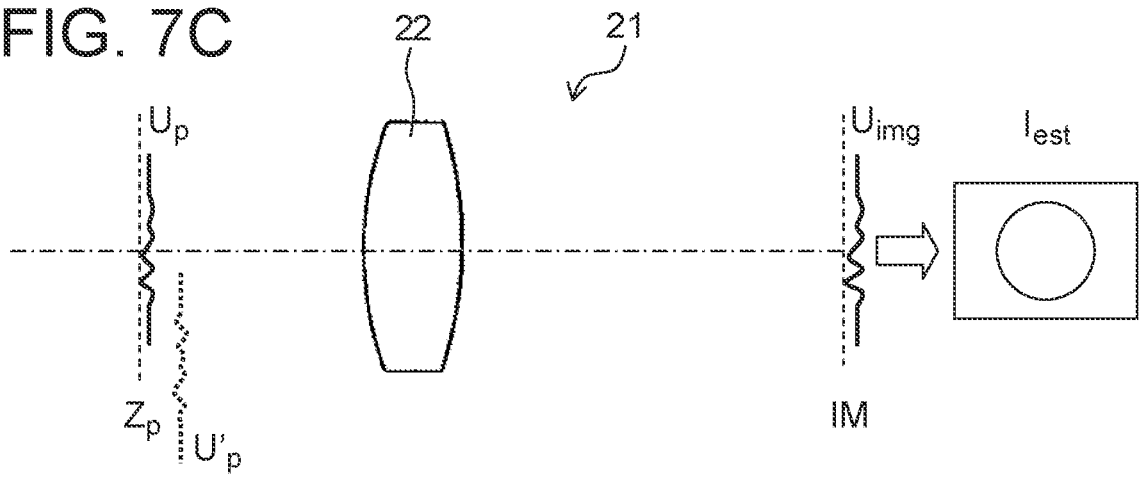

FIGS. 7A, 7B, and 7C are diagrams illustrating the measured image and the estimated image. FIG. 7A illustrates how the measured image is obtained. FIGS. 7B and 7C illustrate how the estimated image is obtained.

As shown in FIG. 7A, the object 20 and a measurement optical system 21 are used to obtain the measured image. The measurement optical system 21 includes a lens 22.

Location $Z_{f0}$ in FIG. 7A indicates the location of the focal point of the measurement optical system 21. Location $Z_s$ indicates the location of the image side surface of the object 20.

The measurement optical system 21 forms an optical image of the object 20 at location $Z_{f0}$ in an image forming plane IM. In the case shown in FIG. 7A, the points inside the object 20 that are separated from the location $Z_s$ by distance ΔZ are located at location $Z_{f0}$.

A CCD 23 is disposed in the image forming plane IM. The optical image of the object 20 is imaged by the CCD23. Thus, an image of the optical image of the object 20 is obtained. This image will be referred to as the "measured image $I_{mea}$" hereinafter. Measured wave front information is calculated from the measured image $I_{mes}$.

The image of the optical image is a light intensity image, and the measured image $I_{mes}$ is also a light intensity image. As the measured image $I_{mea}$ is a light intensity image, the measured wave front information calculated from the measured image $I_{mea}$ is also light intensity information. In the case where the light intensity is used, the measured image may be used as the wave front information.

The estimated wave front information is calculated from an image of an optical image of an estimated object 24. This image will be referred to as the "estimated image $I_{est}$" hereinafter.

FIG. 7C shows the measurement optical system 21. Since the estimated image $I_{est}$ is calculated by simulation, the measurement optical system 21 does not exist physically. In the calculation of the estimated image $I_{est}$, the pupil function of the measurement system 21 is used.

The estimated image $I_{est}$ is obtained from an image of the estimated object 24 in the image forming plane IM. Since the measured image $I_{mea}$ is a light intensity image, it is preferred that the estimated image $I_{est}$ be also a light intensity image. Therefore, it is necessary to calculate the light intensity of the estimated object 24 in the image forming plane IM.

In step S400, estimated wave front information is calculated.

Figure 8:
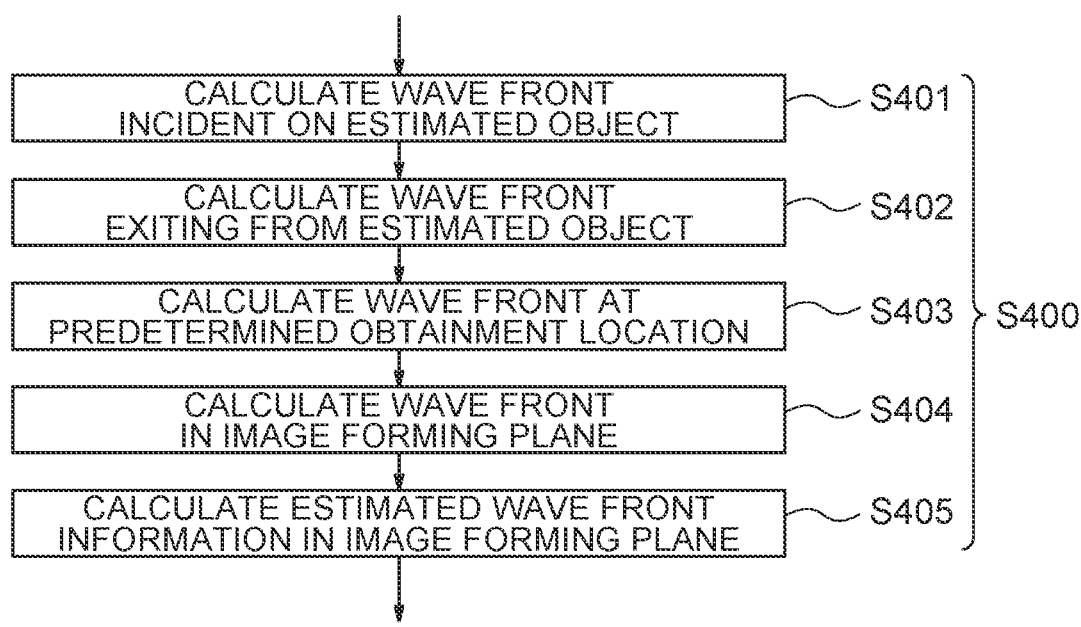
FIG. 8 is a flow chart of a process of calculating estimated wave front information.

FIG. 8 is a flow chart of the calculation of the estimated wave front information. Step S400 includes steps S401, S402, S403, S404, and S405.

The calculation of the estimated wave front information is performed based on forward propagation of the wave front, which is propagation of the wave front in the direction of travel of the illumination light. Backward propagation is propagation of the wave front in the direction opposite to the direction of travel of the illumination light. In the case of forward propagation, the wave front propagates from the estimated object 24 toward the image forming plane IM, as show in FIGS. 7B and 7C.

In step S401, the wave front incident on the estimated object is calculated.

Location $Z_{in}$ in FIG. 7B is the location of the surface of the estimated object 24 corresponding to the surface of the object 20 that faces the light source for illumination. Location $Z_{in}$ indicates the location of the surface of the estimated object 24 on which simulated light is incident. Therefore, the wave front $U_{in}$ at the location $Z_{in}$ is calculated. As the wave front $U_{in}$, the wave front same as the wave front of the measurement light cast to the object 20 may be used.

In step S402, the wave front exiting from the estimated object is calculated.

Location $Z_{out}$ in FIG. 7B is the surface of the estimated object 24 corresponding to the image side (i.e., lens side or CCD side) surface of the object 20. Location $Z_{out}$ indicates the location of the surface of the estimated object 24 from which simulated light exits. Therefore, the wave front $U_{out}$ at location $Z_{out}$ is calculated. The wave front $U_{out}$ can be calculated from the wave front $U_{in}$ using the beam propagation method.

In step S403, the wave front at a predetermined obtainment location is calculated.

The predetermined obtainment location is a location on the object side at the time when a measured image is obtained. The predetermined obtainment location is an arbitrary location between location $Z_{in}$ and location $Z_{out}$. Location $Z_p$ in FIG. 7B is one of the predetermined obtainment locations. Location $Z_p$ is the location conjugate with the image forming plane IM.

The estimated image $I_{est}$ is calculated under the same condition as the measured image $I_{mea}$. The measured image $I_{mea}$ is obtained from an optical image of the interior of the object 20 at the location separated from location $Z_s$ by distance $\Delta Z$. Therefore, to calculate the estimated image $I_{est}$, it is necessary to calculate the wave front at the location separated from location Z s by distance $\Delta Z$.

In FIG. 7B, location $Z_{out}$ corresponds to location $Z_s$. The location separated from location $Z_{out}$ by distance $\Delta Z$ is location $Z_p$. Therefore, the wave front $U_p$ at location $Z_p$ may be calculated.

Location $Z_p$ is separated from location Z out by distance $\Delta Z$. Therefore, the wave front $U_{out}$ cannot be used as the wave front $U_p$. For example, the wave front $U_p$ can be calculated from the wave front U out using the beam propagation method.

In step S404, the wave front in the image forming plane is calculated.

The wave front $U_p$ passes through the measurement optical system 21 to reach the image forming plane IM. The wave front $U_{img}$ in the image forming plane IM can be calculated from the wave front $U_p$ and the pupil function of the measurement optical system 21.

In step S405, estimated wave front information in the image forming plane is calculated.

The wave front $U_{img}$ represents the amplitude of light. The light intensity is represented by the square of the amplitude. Therefore, the light intensity of the o estimated object 24 can be calculated by squaring the wave front $U_{img}$. As a result, an estimated image Test is obtained. The estimated wave front information is calculated from the estimated image Test.

The light intensity may be replaced by the amplitude and phase. The amplitude and phase are expressed by an electrical field. When the amplitude and phase are used, the measurement value and the estimated value are calculated from the electrical field. The measurement-based electrical field $E_{mes}$ and the estimation-based electrical field $E_{est}$ are expressed by the following equations:

$$E_{mes} = A_{mes} \times \exp(I \times P_{mes})$$ and $$E_{est} = A_{est} \times \exp(I \times P_{est})$$

where $P_{mes}$ is the measurement-based phase, $A_{mes}$ is the measurement-based amplitude, $P_{est}$ is the estimation-based phase, and $A_{est}$ is the estimation-based amplitude.

In the process of obtaining the measurement-based electrical field $E_{mes}$, measurement light and reference light are made incident on the light sensor in a non-parallel state.

The measurement light and the reference light form interference fringes on the imaging surface of the light sensor. The interference fringes are imaged by the light sensor. Thus, an image of the interference fringes is obtained.

The interference fringes are formed by the measurement light and the reference light that are not parallel. Therefore, the measurement-based phase and the measurement-based amplitude can be obtained by analyzing the interference fringes. As a result, the measurement-based electrical field $E_{mes}$ can be obtained. The estimation-based electrical field $E_{est}$ can be obtained by simulation.

The complex amplitude can also be obtained by analyzing the interference fringes. The complex amplitude may be used as wave front information instead of the light intensity.

Referring back to FIG. 6, in step S410, the estimated wave front information is constrained with the wave front information W(m, n).

The wave front information W(m, n) is obtained from an image of the interference fringes I(m, n). The interference fringes I(m, n) is formed by the measurement light. Therefore, the wave front information W(m, n) can be regarded as the measured wave front information mentioned in the above description of step S400.

The values of variable m are ordinal numbers related to the relative angle. The values of variable n are ordinal numbers related to the wavelength. The wave front information W(m, n) represents the measured wave front information obtained at the m-th relative angle with the illumination light of the n-th wavelength.

In step S210, the value of variable n is set to 1. As descried in the description of step S120 above, the values of the wavelength $\lambda(n)$ are set such that the wavelength is made shorter as the value of variable n increases. Therefore, when the value of variable n is 1, the value of $\lambda(n)$ is set to the longest wavelength.

When the value of variable n is 1, the wave front information W(m, n) is the wave front information obtained using the longest wavelength. The longest wavelength is the wavelength of the first illumination light. Therefore, when the value of variable n is 1, the wave front information W(m, n) is the wave front information obtained using the first illumination light.

The wave front information obtained using the first illumination light is the first wave front information. Therefore, when the value of variable n is 1, the wave front information W(m, n) is the first wave front information. In this case, the processing performed in step S410 is the processing of constraining the estimated wave front information with the first wave front information.

The first optimization process is the process using the first wave front information as a constraint. When the value of variable n is 1, the estimated wave front information is constrained with the first wave front information in step S410. In this case, therefore, the processing of step S410 is the first optimization process.

As will be described later, the value of variable is varied. Therefore, the value of variable n is set to a value other than 1 also. Then, the value of the wavelength λ(n) is set to another wavelength.

Another wavelength is a wavelength shorter than the longest wavelength. The longest wavelength is the wavelength of the first illumination light. The wavelength of the second illumination light is shorter than the wavelength of the first illumination light. Therefore, another wavelength is the wavelength of the second illumination light.

When the value of variable n is not 1, the wave front information W(m, n) is the wavelength information obtained using another wavelength. Another wavelength is the wavelength of the second illumination light. Therefore, when the value of variable n is not 1, the front information W(m, n) is the wave front information obtained using the second illumination light.

The wave front information obtained using the second illumination light is the second wave front information. Therefore, when the value of variable n is 2, the wave front information W(m, n) is the second wave front information. In this case, the processing performed in step S410 is the processing of constraining the estimated wave front information with the second wave front information. When the value of variable n is 3, the wave front information W(m, n) is the third wave front information. In this case, the processing performed in step S410 is the processing of constraining the estimated wave front information with the third wave front information.

The second optimization process is the process using the second wave front information as a constraint. When the value of variable n is 2, the estimated wave front information is constrained with the second wave front information in step S410. In this case, therefore, the processing of step S410 is the second optimization process. When the value of variable n is 3, the estimated wave front information is constrained with the third wave front information in step S410. In this case, therefore, the processing of step S410 is the third optimization process.

Measured wave front information is calculated from a measured image $I_{mea}$. Estimated wave front information is calculated from an estimated image $I_{est}$. It is possible to calculate an evaluation value from the difference between the measured wave front information and the estimated wave front information or the ratio of the measured wave front information and the estimated wave front information. Constraining the estimated wave front information with the measured wave front information means refining the estimated wave front information using the measured wave front information or calculating the error between the estimated wave front information and the measured wave front information, which is substantially similar to calculating an evaluation value.

The difference between the measured image $I_{mea}$ and the estimated image $I_{est}$ or the ratio of the measured image $I_{mea}$ and the estimated image $I_{est}$ may be used as the evaluation value.

In step S420, the evaluation value is compared with a threshold value.

In the case where the evaluation value is represented by the difference between the measured wave front information and the estimated wave front information, the difference between the measured wave front information and the estimated wave front information is calculated as the evaluation value. The evaluation value is compared with the threshold value. If the result of the determination in step S420 is NO (negative), the processing of step S500 is performed next. If the result of the determination in step S420 is YES (affirmative), the processing of step S430 is performed next.

In the case where the result of the determination in step S420 is NO (i.e. "threshold value" "evaluation value"), the processing of step S500 is performed.

In step S500, the three-dimensional optical property of the estimated object is calculated.

The calculated three-dimensional optical property of the estimated object 24 is the equal to or substantially equal to the three-dimensional optical property of the object 20. It is possible to reconstruct the estimated object using the three-dimensional optical property obtained in step S500.

For example, the reconstructed estimated object can be output on a display device.

As described above, the three-dimensional optical property calculated in step S500 is the same or substantially the same as the three-dimensional optical property of the object 20. Therefore, the reconstructed estimated object can be considered to have the same or substantially the same structure as the object 20.

In the case where the result of the determination in step S420 is YES (i.e. "threshold value" "evaluation value"), the processing of step S430 is performed. In step S430, a gradient is calculated.

Step S430 includes steps S431 and S432.

The gradient is calculated based on backward propagation of the wave front. In backward propagation, the wave front propagates from location $Z_{out}$ toward location $Z_{in}$.

In step S431, the wave front after correction is calculated.

In the case where the calculation is based on the light intensity, images can be used as the wave front information. Therefore, the measured image $I_{mea}$ and the estimated image $I_{est}$ are used in the calculation of the corrected wave front $U'_p$. The wave front $U'_p$ is the wave front at the location $Z_p$.

As shown in FIG. 7C, the estimated image $I_{est}$ is calculated based on the wave front $U_{img}$. The wave front $U_{img}$ is calculated based on the wave front $U_p$.

In the case where this process includes step S150, the initial value set in step S150 is used in the calculation of the wave front $U_p$. The initial value is the value of the three-dimensional optical property of the estimated object 24. When the processing of step S430 is performed for the first time, there is a difference between the initial value and the value of the three-dimensional optical property of the object 20. The value of the three-dimensional optical property of the object 20 will be hereinafter referred to as the "object property value".

The larger the difference between the initial value and the object property value is, the larger the difference between the estimated image $I_{est}$ and the measured image $I_{mea}$ is. Therefore, the difference between the estimated image $I_{est}$ and the measured image $I_{mea}$ can be considered to reflect the difference between the initial value and the object property value.

In the case where the calculation is based on the light intensity, images can be used as the wave front information.

Therefore, the wave front $U_p$ is corrected using the estimated image $I_{est}(r)$ and the measured image $I_{mea}(r)$. As a result, the corrected wave front $U'_p$ is obtained.

For example, the wave front $U'_p$ is expressed by the following equation (1).

$$U'_p = U_p \times \sqrt{(I_{mea}/I_{est})} \qquad (1)$$

In step S432, the gradient is calculated.

The gradient can be calculated based on backward propagation of the wave front.

In the backward propagation, the wave front that propagates from location $Z_{out}$ toward location $Z_{in}$ is calculated. Therefore, to calculate the gradient, the corrected wave front $U'_{out}$ at location $Z_{out}$ is needed.

Since the wave front $U'_p$ is a correction of the wave front $U_p$, the wave front $U'_p$ is the wave front at location $Z_p$. In FIG. 7C, the wave front $U'_p$ is drawn at a location displaced from location $Z_p$ for the sake of convenience. In FIG. 7B, the wave front $U'_{out}$ is drawn at a location displaced from location $Z_{out}$ for the sake of convenience.

As shown in FIGS. 7B and 7C, location $Z_{out}$ is separated from location $Z_p$ by distance $\Delta Z$. Therefore, the wave front $U'_p$ cannot be used as the wave front $U'_{out}$. For example, the wave front $U'_{out}$ can be calculated from the wave front $U'_p$ using the beam propagation method.

After the wave front $U'_{out}$ is calculated, calculation of the wave front is performed based on backward propagation of the wave front. In backward propagation of the wave front, the wave front that propagates inside the estimated object 24 is calculated. In the calculation of the wave front, the wave front $U_{out}$ and the wave front $U'_{out}$ are used.

The wave front $U'_p$ is different from the wave front $U_p$. Therefore, the wave front $U'_{out}$ is also different from the wave front $U_{out}$. The gradient can be calculated using the wave front $U'_{out}$ and the wave front $U_{out}$. The gradient calculated is the gradient of the wave front at an arbitrary location inside the object. The gradient contains new information on the three-dimensional optical property of the estimated object 24.

In step S461, it is determined whether the value of variable m is equal to the value of the number of times $N\theta$ of changing the angle. If the result of the determination is NO (negative), the processing of step S462 is performed next. If the result of the determination is YES (affirmative), the processing of step S440 is executed next.

In the case where the result of the determination in step S461 is NO (m≠N$\theta$), the processing of step S462 is performed. In step S462, the value of variable m is incremented by 1. After the completion of step S462, the process returns to step S400.

Since the value of variable m was incremented by 1 in step S462. This increment of the value of variable m also applies to variable m in the wave front information W(m, n). Therefore, the processing of steps S400 through S430 is performed for the wave front information at another relative angle. The processing of steps S400 through S430 is repeatedly executed until the positioning has been performed at all the relative angles.

In the case described above, the value of the number of times NO of changing the angle is set to 5. Therefore, the processing of step S400 through S430 is performed five times.

For example, when the relative angle is different between wave front information A and wave front information B, wave front information A contains information that wave front information B does not contain, and wave front information B contains information that wave front information A does not contain. Therefore, the greater the number of pieces of wave front information obtained at different relative angles is, the larger the amount of wave front information is.

An increase in the amount of information improves the accuracy of calculation of the corrected wave front in step S431. In consequence, the accuracy of the gradient is also improved. The gradient contains information on the difference between the estimated value and the object property value. Improving the accuracy of the gradient can decrease the difference between the estimated value and the object property value. In other words, the estimated value can be made closer to the object property value.

In the case where the result of the determination in step S461 is YES (m=N$\theta$), the processing of step S440 is performed. In step S440, the estimated value is updated.

The gradient contains information on the difference between the estimated value and the object property value. Therefore, an updated estimated value is obtained by adding the gradient to the estimated value.

The updated estimated value is closer to the object property value than the initial value. Therefore, it is possible to update the value of the three-dimensional optical property of the estimated object 24 using the updated estimated value.

In step S450, TV regularization is performed.

Performing TV regularization can remove noises and image blurs. TV regularization may be performed when need be. Step S450 may be removed.

In step S463, it is determined whether the value of variable i is equal to the number of times N(n) of iterations. If the result of the determination is NO (negative), the processing of step S464 is performed. If the result of the determination is YES (affirmative), the processing of step S465 is performed.

In the case where the result of the determination in step S463 is NO (i≠N(n)), the processing of step S464 is performed. In step S464, the value of variable i is incremented by 1. After the completion of step S464, the process returns to step S230.

The value of variable i is incremented by 1 in step S464. However, the value of variable n in the wave front information W(m, n) does not change. Since the value of variable n is 1, the processing of step S300 is performed with the first wave front information again. The processing of step S300 is performed iteratively until the value of variable i becomes equal to the number of iterations N(n).

In step S230, the value of variable m is set to 1. Therefore, the processing of steps S400 through S430 is performed iteratively until the value of variable m becomes equal to the number of times NO of changing the angle.

In the case described above, when the value of variable n is 1, the number of iterations N(n) is set to 3. Therefore, the processing of step S300 is performed three times. The processing of step S410 is the first optimization process. In the case described above, since the processing of step S300 is performed three times, the first optimization process is performed three times.

The estimated value is updated by the first run of the first optimization process. The estimated value after the update is closer to the object property value than the initial value. In the second run of the first optimization process, the updated estimated value is used. The second run of the first optimization process can make the estimated value closer to the object property value. Multiple runs of the first optimization process can make the estimated value closer to the object property value.

In the case where the result of the determination in step S463 is YES (i=N(n)), the processing of step S465 is performed. In step S465, it is determined whether the value of variable n is equal to the number of wavelengths Nλ'. If the result of the determination is NO (negative), the processing of step S466 is performed. If the result of the determination is YES, the process is ended.

In the case where the result of the determination in step S465 is NO (n≠Nλ'), the processing of step S466 is performed. In step S466, the value of variable n is incremented by 1. After the completion of step S466, the process returns to step S220.

The value of variable n is incremented by 1 in step S466. Then, the value of variable n in the wave front information W(m, n) changes. Since the value of variable n is not 1, the processing of step S300 is performed with the second wave front information. When the value of variable n is 2, the processing of step S300 is performed with the second wave front information. When the value of variable n is 3, the processing of step S300 is performed with the third wave front information.

The value of variable i is set to 1 in step S220. Therefore, the processing of step S300 is performed iteratively until the value of variable i becomes equal to the value of the number of iterations N(n).

The value of variable m is set to 1 in step S230. Therefore, the processing of steps S400 through S430 is performed iteratively until the value of variable m becomes equal to the value of the number of times NO of changing the angle.

In the case described above, when the value of variable n is 2, the number of iterations N(n) is set to 2. Therefore, the processing of step S300 is performed twice. The processing of step S410 is the second optimization process. In the case described above, since the processing of step S300 is performed twice, the second optimization process is performed twice.

The first optimization process has been performed before the second optimization process is performed. Therefore, the initial value used in the second optimization process is the estimated value that has been updated by the first optimization process. The initial value used in the second optimization process is closer to the object property value than the initial value used in the first optimization process. Therefore it is possible to further make the estimated value closer to the object property value.

The estimated value is updated by the first run of the second optimization process. The estimated value after the update is closer to the object property value than the initial value. In the second run of the second optimization process, the updated estimated value is used. The second run of the second optimization process can make the estimated value closer to the object property value. Multiple runs of the second optimization process can make the estimated value closer to the object property value.

The processing of step S300 is performed iteratively until the value of variable n becomes equal to the number of wavelengths Nλ'. In the case described above, the value of the number of wavelengths Nλ' is set to 3. Therefore, the optimization process is performed three times.

As above, when the value of variable n is 1, the first optimization process is performed once, and when the value of variable n is 2, the second optimization process is performed once. Therefore, if the third optimization process is performed when the value of variable n is 3, the value of variable n becomes equal to the number of wavelengths Nλ'.

In the case described above, the value of λ(1) is set to 1500 nm, the value of λ(2) is set to 650 nm, and the value of λ(3) is set to 480 nm.

The illumination light having a wavelength of 1500 nm is the first illumination light. The optimization process for this wavelength is the first optimization process, which is performed when the value of variable n is 1. The illumination light having a wavelength of 650 nm is the second illumination light. The optimization process for this wavelength is the second optimization process, which is performed when the value of variable n is 2.

The optimization process that is used when the value of variable n is 3 is the third optimization process. The third optimization process is the optimization process for the wavelength of 480 nm. The illumination light having a wavelength of 480 nm is the second illumination light. Therefore, the optimization process for the wavelength of 480 nm is the same as the second optimization process. Therefore it will not be described in further detail.

When the value of variable n is 3, the optimization processes may be performed in one of the following orders.

(1) performing the first optimization process first, then the second optimization process, and then the third optimization process.

(2) performing the first optimization process first, then the third optimization process, and then the second optimization process.

When the value of variable n is 3, the optimization processes may be performed with one of the following combinations.

(1)
the first optimization process with the illumination light having a wavelength of 1500 nm, and
the second optimization process with the illumination light having a wavelength of 650 nm.
(2)
the first optimization process with the illumination light having a wavelength of 1500 nm, and
the second optimization process with the illumination light having a wavelength of 480 nm.
(3)
the first optimization process with the illumination light having a wavelength of 650 nm, and
the second optimization process with the illumination light having a wavelength of 480 nm.

For example, in the case where wave front information A and wave front information B are obtained at different wavelengths, wave front information A contains information that wave length information B does not contain, and wave front information B contains information that wave length information A does not contain. Therefore, the greater the number of pieces of wave front information obtained at different wavelengths is, the larger the amount of information is.

The larger the amount of information is, the more accurate the calculation of the corrected wave front in step S431 is, and the higher the accuracy of the gradient is consequently. The gradient contains information on the difference between the estimated value and the object property value. Increasing the accuracy of the gradient can decrease the difference between the estimated value and the object property value. In other words, increasing the accuracy of the gradient can make the estimated value closer to the object property value. Therefore, it is preferred that each of the first and second optimization processes be performed two or more times.

In the case where the result of the determination in step S465 is YES (n=Nλ'), the predetermined number of iterations has been reached. Then, the three-dimensional optical property of the estimated object is calculated in step S500, and then the process is ended.

As described above, when illumination light having a long wavelength is used, a large amount of wave front information can be obtained with respect to the axial direction. A some amount of information can be obtained with respect to the lateral direction also. The wavelength of the illumination light used to obtain the first wave front information is longer than the wavelength of the illumination light used to obtain the second wave front information. The three-dimensional optical property of the estimated object can be estimated roughly by using the first wave front information.

The first wave front information is used in the first optimization process. Therefore, the three-dimensional optical property of the estimated object can be estimated roughly by performing the first optimization process.

The value of variable n is set to 1 in step S210. Therefore, the processing of step S410 that is performed in its first run is the first optimization process. The three-dimensional optical property of the estimated object can be estimated roughly by the first optimization process. Therefore, performing the first optimization process before the second optimization process enables efficient estimation of the three-dimensional optical property of the estimated object.

In the first estimation process, each of the first and second optimization processes is performed two or more times. This can prevent a decrease in the resolution and a decrease in the accuracy of estimation. Therefore, it is possible to provide an estimation apparatus that can determine the three-dimensional optical property of the object with high accuracy and high resolution even in the case where the thickness of the object is large.

It is preferred that the processor of the estimation apparatus according to embodiment perform the first optimization process consecutively on the initial value set for the three-dimensional optical property.

As described above, the process may include step S150 when necessary. In the case where the process includes step S150, an initial value is set for the estimated value of the three-dimensional optical property. In this case, it is preferred that the first optimization process be performed consecutively on the initial value set for the three-dimensional optical property.

It is preferred with the estimation apparatus according to the embodiment that the estimation process include the first optimization process that uses the first wave front information as a constraint and the second optimization process that uses the second wave front information as a constraint, the processor perform a combined process consisting of a first optimization process and a second optimization process two or more times, the first optimization process be performed first in the combined process, and the first optimization process be not performed after the second optimization process is performed in the combined process.

Figure 9:
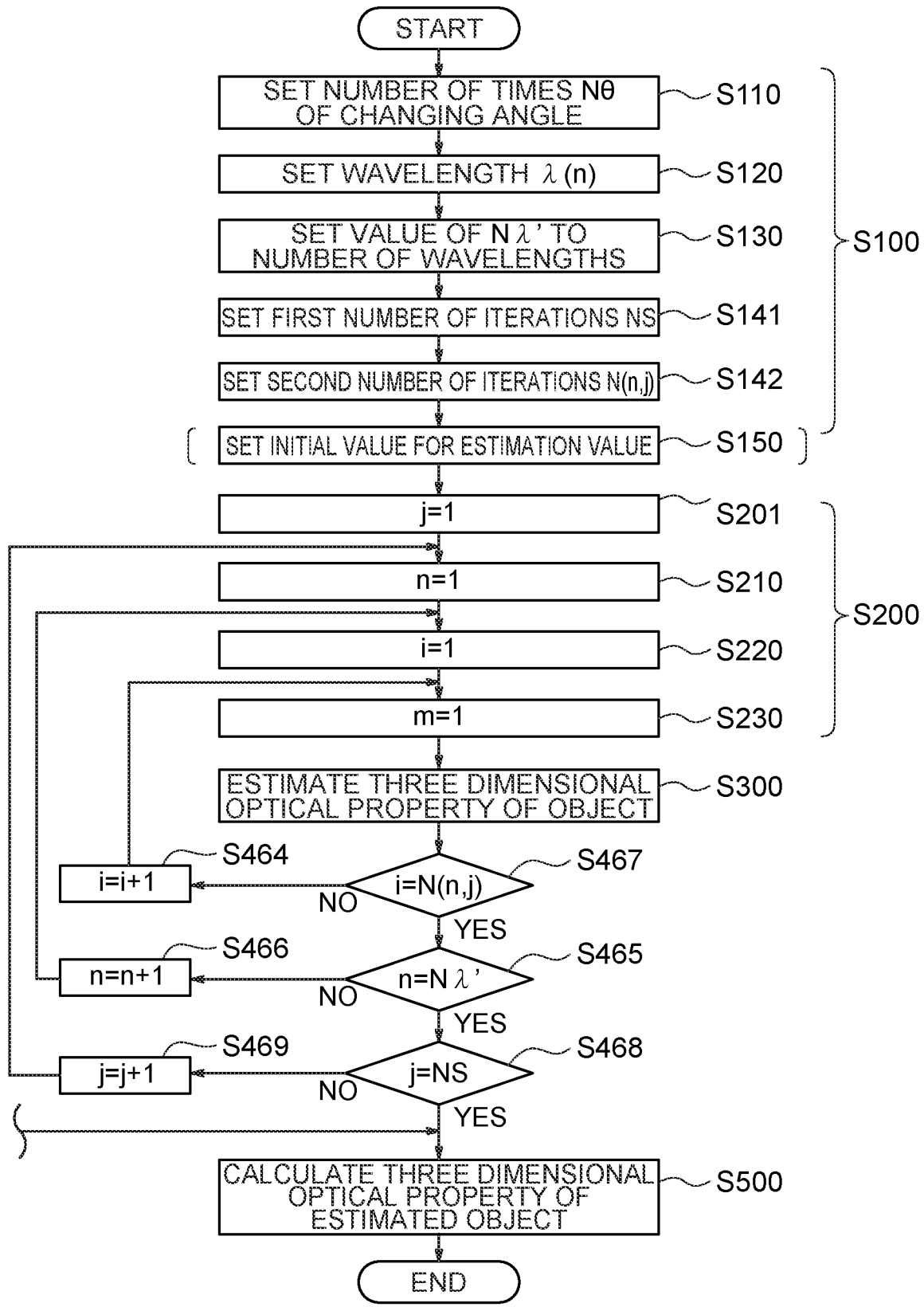
FIG. 9 is a flow chart of a second estimation process.

FIG. 9 is a flow chart of a second estimation process. The steps similar to the corresponding steps of the first estimation process are denoted by the same step numbers and will not be described in further detail.

In the following the combined process will be described. Therefore, the following description is directed to a case where the combined process is started at the beginning of the estimation process. Alternatively, however, the combined process may be started after certain optimization processes such as the first and second optimization processes have been performed a certain number of times.

The second estimation process includes a combined process. The combined process consists of a first optimization process and a second optimization process. The combined process is performed two or more times.

To perform the combined process multiple times, the second estimation process includes steps S141, S142, S201, S467, S468, and S469.

For example, in the case where the selected wavelengths are 1500 nm and 650 nm, the values of the wavelength $\lambda(n)$ are set as follows.

$\lambda(1)=1500$ nm
$\lambda(2)=650$ nm

In the above case, since the number of selected wavelengths is 2, the value of the number of wavelengths $N\lambda'$ is set to 2.

In step S141, the first number of iterations NS is set. The first number of iterations NS is the number of times of performing the combined process. For example, in the case where the combined process is performed two times, the first number of iterations NS is set to 2.

In step S142, the second number of iterations $N(n, j)$ is set. The second number of iterations $N(n, j)$ is the number of times of performing the optimization process.

The second number of iterations $N(n, j)$ and the wavelength $\lambda(n)$ use variable n. This means that the second number of iterations $N(n, j)$ is set for each of the values (or wavelengths) set for the wavelength $\lambda(n)$.

The number of times performing the optimization process may be varied among the combined processes. Therefore, the second number of iterations $N(n, j)$ is set for each run of the combined process.

In the case described above, the number of selected wavelengths is 2, and the number of times of performing the combined process is 4. For example, the values of the second number of iterations $N(n, j)$ are set as follows.

$N(1, 1)=5$
$N(2, 1)=1$
$N(1, 2)=5$ (the number remains 5)
$N(2, 2)=1$
$N(1, 3)=3$ (the number is reduced from 5 to 3)
$N(2, 3)=1$
$N(1, 4)=3$ (the number remains 3)
$N(2, 4)=1$
$N(1, 4)=1$ (the number is reduced from 3 to 1)
$N(2, 4)=1$ In the above case, the number of times of performing the first optimization process is equal to or greater than the number of times of performing the second optimization process. The difference between the number of times of performing the first optimization process and the number of times of performing the second optimization process decreases. After the combined process is performed consecutively, the difference between the number of times of performing the first optimization process and the number of times of performing the second optimization process decreases.

The number of times of performing the second optimization process may be increased to decrease the difference between the number of times of performing the first optimization process and the number of times of performing the second optimization process.

In step S201, the value of variable j is set to 1.

As the value of variable j is 1, the first run of the combined process is performed. The value of variable n is set to 1 in step S210. Therefore, the first optimization process is performed in the first run of the processing of step S300.

In step S467, it is determined whether the value of variable i is equal to the value of the second number of iterations N(n, j). If the result of the determination is NO (negative), the processing of step S464 is performed next. If the result of the determination is YES (affirmative), the processing of step S465 is performed.

In the case where the result of the determination in step S467 is NO (i≠N(n, j), the processing of step S464 is performed. In step S464, the value of variable i is incremented by 1. After the completion of step S464, the process returns to step S230.

The value of variable i is incremented by 1 in step S464. However, the value of variable n is not changed but remains 1. Therefore, the first optimization process is performed again in the processing of step S300. The first optimization process is performed repeatedly until the value of variable i becomes equal to the number of iterations N(n).

Since the value of variable j is not changed, the value of variable j remains 1. In the case described above, when the value of variable n is 1 and the value of variable j is 1, the value of the second number of iterations N(n, j) is set to 3. Therefore, the first optimization process is performed three times.

In the case where the result of the determination in step S467 is YES (i=N(n, j)), the processing of step S465 is performed. In step S465, it is determined whether the value of variable n is equal to the number of wavelengths Nλ'. If the result of the determination is NO (negative), the processing of step S466 is performed. If the result of the determination is YES (affirmative), the processing of step S468 is performed.

In the case where the result of the determination in step S465 is NO (n≠Nλ'), the processing of step S466 is performed. In step S466, the value of variable n is incremented by 1. After the completion of step S466, the process returns to step S229.

The value of variable n is incremented by 1 in step S466. Then, since the value of variable n is not 1, the second optimization process is performed in the processing of step S300.

The value of variable i is set to 1 in step S220. Therefore, the second optimization process is performed repeatedly, until the value of variable i becomes equal to the second number of iterations N(n, j).

The value of n is changed from 1 to 2. The value of variable j is not changed but remains 1. In the case described above, when the value of variable n is 2 and the value of variable j is 1, the value of the second number of iterations N(n, j) is set to 2. Therefore, the second optimization process is performed twice.

In the case where the result of the determination in step S465 is YES (n=Nλ'), the processing of step S468 is performed. In step S468, it is determined whether the value of variable j is equal to the first number of iterations NS. If the result of the determination is NO (negative), the processing of step S469 is performed. If the result of the determination is YES (affirmative), the process is ended.

In the case where the result of the determination in step S468 is NO (n≠NS), the processing of step S469 is performed. In step S469, the value of variable j is incremented by 1. After the completion of step S469, the process returns to step S210.

The value of variable j is incremented by 1 in step S469. Then, the value of variable j is 2, and therefore the second run of the combined process is performed.

In step S210, the value of variable n is set to 1. Therefore, the first optimization process is performed. In step S220, the value of variable i is set to 1. Therefore, the second optimization process is performed repeatedly until the value of variable i becomes equal to the second number of iterations N(n, j).

The value of variable n is 1, and the value of variable j is 2. In the case described above, when the value of variable n is 2 and the value of variable j is 1, the value of the second number of iterations N(n, j) is set to 1. Therefore, the first optimization process is performed once.

After the first optimization process is finished, the value of variable n is changed from 1 to 2. Then, the second optimization process is performed. In step S220, the value of variable i is set to 1. Therefore, the second optimization process is performed repeatedly until the value of variable i becomes equal to the second number of iterations N(n, j).

The value of variable n is 2, and the value of variable j is 2. In the case described above, when the value of variable n is 2 and the value of variable j is 2, the value of the second number of iterations N(n, j) is set to 4. Therefore, the second optimization process is performed four times.

In the case where the result of the determination in step S468 is YES (n=NS), the predetermined number of iterations has been reached. Then, the three-dimensional optical property of the estimated object is calculated in step S500, and then the process is ended.

As above, in the second estimation process, the combined process is performed two or more times. In this case, the first optimization process and the second optimization process are performed alternately. This can prevent a decrease in the resolution and a decrease in the accuracy of estimation. Therefore, it is possible to provide an estimation apparatus, an estimation system, an estimation method, and a recording medium that can determine the three-dimensional optical property of an object with high accuracy and high resolution even when the thickness of the object is large.

It is preferred that the processor of the estimation apparatus according to the embodiment perform the combined process on an initial value set for the three-dimensional optical property.

As described above, the process may include step S150 when necessary. In the case where the process includes step S150, an initial value is set for the estimated value of the three-dimensional optical property. In this case, it is preferred that the combined process be performed on the initial value set for the three-dimensional optical property.

It is preferred that the estimation apparatus according to the embodiment be configured to control the combined process such that the number of times of performing the first optimization process is equal to or greater than the number of times of performing the second optimization process.

As described above, the three-dimensional optical property of the estimated object can be estimated roughly by performing the first optimization process. Therefore, it is possible to roughly estimate the three-dimensional optical property of the estimated object with high efficiency by using the first wave front information a greater number of times than the second wave front information.

In the case where the process includes step S150, an initial value is set for the estimated value in the first and second estimation processes. There is a difference between the initial value and the object property value. Therefore, it is possible to make the estimated value closer to the object property value by performing the first optimization process as early as possible. This enables efficient estimation.

The estimation apparatus according to the embodiment is configured to perform a specific process in the combined process. In the specific process, the first optimization process is performed a greater number of times than the second optimization process. The first optimization process is performed before the second optimization process. Therefore, the estimation apparatus according to the embodiment can estimate the three-dimensional optical property of the estimated object with high efficiency.

It is preferred in the estimation apparatus according to the embodiment that the control continue through the consecutive combined processes.

It is preferred that the estimation apparatus according to the embodiment perform the control of decreasing the difference between the number of times of performing the second optimization process and the number of times of performing the first optimization process in the combined process after performing the combined process a predetermined number of times.

The estimation apparatus according to the embodiment performs the specific process in the second combined process. In the specific process, the first optimization process is performed a greater number of times than the second optimization process. The estimation apparatus according to the embodiment performs the first optimization process before the second optimization process. Therefore, the estimation apparatus according to the embodiment can estimate the three-dimensional optical property of the estimated object with high efficiency.

It is preferred that the first illumination light used in the estimation apparatus according to the embodiment be light in the infrared range, and the second illumination light be light in the visible range.

The estimation apparatus according to the embodiment having this feature can estimate the three-dimensional optical property of the estimated object with high efficiency.

It is preferred that the first illumination light used in the estimation apparatus according to the embodiment be light in the infrared range, and the following condition (A) be satisfied:

$$2 \times \lambda 2 < \lambda 1 \tag{A},$$

where $\lambda 1$ is the wavelength of the first illumination light, and $\lambda 2$ is the wavelength of the second illumination light.

The estimation apparatus according to the embodiment having this feature can estimate the three-dimensional optical property of the estimated object with high efficiency.

An estimation system according to the embodiment includes the estimation apparatus according to the embodiment, a light source unit that emits the first illumination light and the second illumination light, a light sensor, a stage on which an object is to be placed, and an angle changing mechanism. The stage is disposed in the optical path from the light source unit to the light sensor. The angle changing mechanism can change the angle of incidence of the first illumination light on the object and the angle of incidence of the second illumination light on the object.

Figure 10:
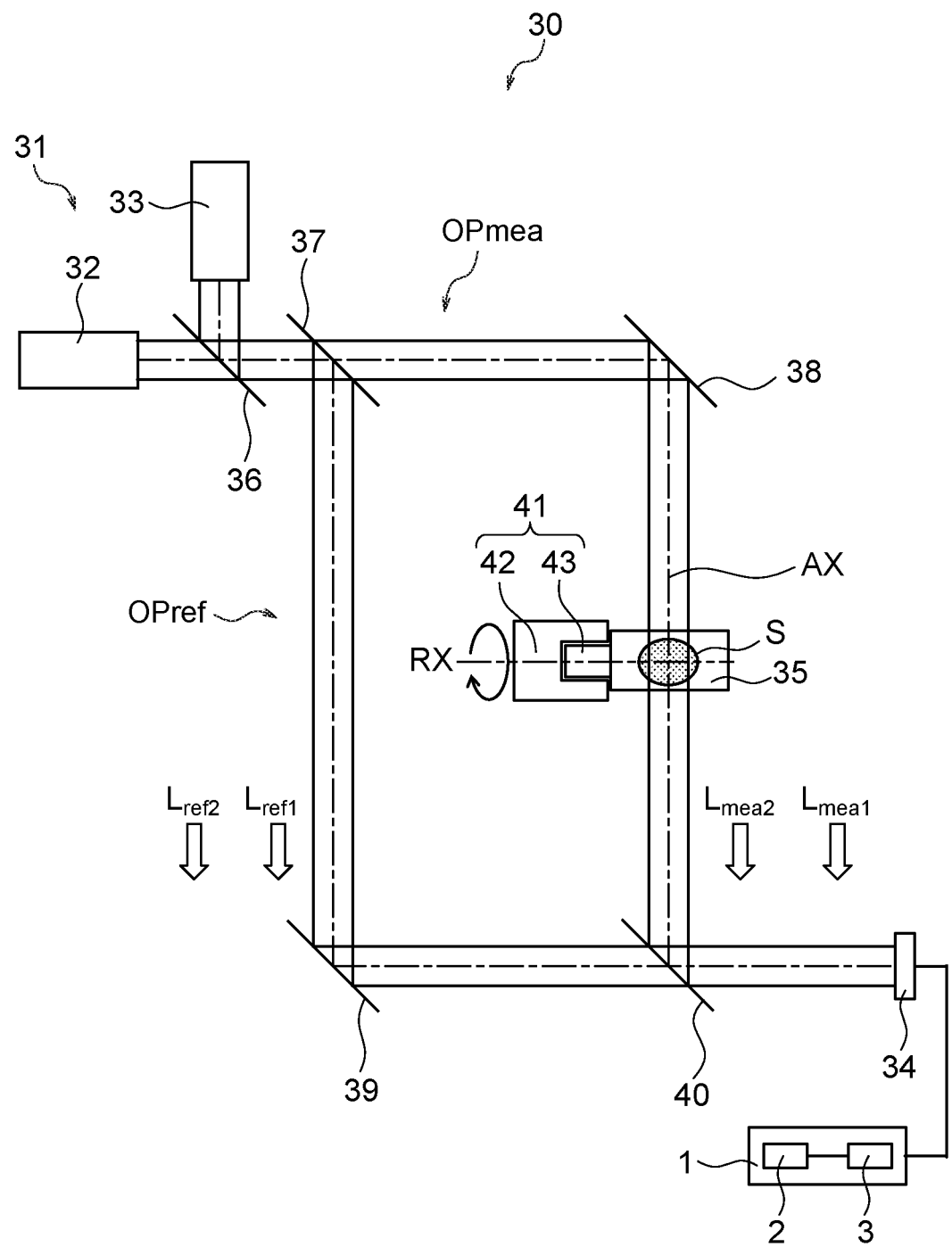
FIG. 10 is a diagram showing an estimation system according to the embodiment.

FIG. 10 is a diagram showing an estimation system according to the embodiment. The components that are similar to those in shown in FIG. 1 are denoted by the same reference numerals and will not be described in further detail.

The estimation system 30 shown in FIG. 10 includes a light source unit 31, a light sensor 34, a stage 35, and an estimation apparatus 1. The estimation apparatus 1 has a memory 2 and a processor 3.

The optical unit 31 can emit the first illumination light and the second illumination light. The light source unit 31 in the estimation system 30 includes a first light source 32 and a second light source 33. The first light source 32 emits the first illumination light. The second light source 33 emits the second illumination light. The longest wavelength in the wavelength band of the second illumination light is shorter than the shortest wavelength in the wavelength band of the first illumination light.

The first illumination light enters a dichroic mirror 36 in a first direction, and the second illumination light enters the dichroic mirror 36 in a direction perpendicular to the first direction.

The dichroic mirror 36 has spectral characteristics that transmit long wavelength light and reflect short wavelength light. Therefore, the first illumination light is transmitted through the dichroic mirror 36 to travel in the first direction, and the second illumination light is reflected by the dichroic mirror 36 to travel in the first direction.

A beam splitter 37 is provided at a location downstream of the dichroic mirror 36 in the first direction. The first illumination light and the second illumination light are incident on the beam splitter 37. The beam splitter 37 has an optical surface having an optical film. The optical film of the beam splitter 37 splits the light incident on it into light transmitted in the first direction and light reflected in the second direction.

The estimation system 30 forms a measurement optical path $OP_{mea}$ in the first direction and a reference optical path $OP_{ref}$ in the second direction. Alternatively, the estimation system 30 may form a reference optical path $OP_{ref}$ in the first direction and a measurement optical path $OP_{mea}$ in the second direction. The first illumination light and the second illumination light travel the measurement optical path $OP_{mea}$ and the reference optical path $OP_{ref}$.

A mirror 38 is provided in the measurement optical path $OP_{mea}$. The mirror 38 bends the measurement optical path $OP_{mea}$ to the second direction. A mirror 39 is provided in the reference optical path $OP_{ref}$. The mirror 39 bends the reference optical path $OP_{ref}$ to the first direction. In consequence, the measurement optical path $OP_{mea}$ and reference optical path $OP_{ref}$ intersect. A beam splitter 40 is provided at the point of intersection of the two optical paths.

The stage 35 is provided in the measurement optical path $OP_{mea}$ between the mirror 38 and the beam splitter 40. An object S is placed on the stage 35. The object S is illuminated with the first illumination light and the second illumination light.

When the object S is illuminated with the first illumination light, the first measurement light $L_{mea1}$ goes out from the object S. The first measurement light $L_{mea1}$ is the first illumination light that has passed through the object S. When the object S is illuminated with the second illumination light, the second measurement light $L_{mea2}$ goes out from the object S. The second measurement light $L_{mea2}$ is the second illumination light that has passed through the object S.

The first reference light $L_{ref1}$ and the second reference light $L_{ref2}$ travel in the reference optical path $OP_{ref}$. The first reference light $L_{ref1}$ is the first illumination light that does not pass through the object S. The second reference light $L_{ref2}$ is the second illumination light that does not pass through the object S.

The first measurement light $L_{mea1}$, the second measurement light $L_{mea2}$, the first reference light $L_{ref1}$, and the second reference light $L_{ref2}$ are incident on the beam splitter 40. The beam splitter 40 has an optical surface having an optical film. The optical film of the beam splitter 40 splits the light incident on it into light that is transmitted in the first direction and light that is reflected in the second direction.

A light sensor 34 is provided at a location downstream of the beam splitter 40 in the first direction. When the first light source 32 and the second light source 33 are on, the first measurement light $L_{mea1}$, the second measurement light $L_{mea2}$, the first reference light $L_{ref1}$, and the second reference light $L_{ref2}$ are incident on the light sensor 34.

When the first light source 32 is turned on and the second light source 33 is turned off, the first measurement light $L_{mea1}$ and the first reference light $L_{ref1}$ are incident on the light sensor 34. When the first light source 32 is turned off and the second light source 33 is turned on, the second measurement light $L_{mea2}$ and the second reference light $L_{ref2}$ are incident on the light sensor 34.

The first measurement light $L_{mea1}$ and the first reference light $L_{ref1}$ form first interference fringes. The second measurement light $L_{mea2}$ and the second reference light $L_{ref2}$ form second interference fringes. Images of the first interference fringes and the second interference fringes are obtained by imaging the first interference fringes and the second interference fringes by the light sensor 34.

The image of the first interference fringes and the image of the second interference fringes are sent to the estimation apparatus 1. The estimation apparatus 1 obtains first wave front information based on the image of the first interference fringes. The estimation apparatus 1 also obtains second wave front information based on the image of the second interference fringes. The first wave front information and the second wave front information are stored in the memory 2. The estimation apparatus 1 performs an estimation process using the first wave front information and the second wave front information.

The estimation apparatus 1 uses multiple pieces of first wave front information and multiple pieces of second wave front information. The angle of incidence of the first illumination light on the object differs among the multiple pieces of first wave front information. The angle of incidence of the second illumination light on the object differs among the multiple pieces of second wave front information.

The estimation system according to the embodiment has the angle changing mechanism. The angle changing mechanism is configured to change the relative direction. The angle changing mechanism can change the angle of incidence of the illumination light on the object. Therefore, it is possible to obtain multiple pieces of first wave front information and multiple pieces of second wave front information.

It is preferred that the angle changing mechanism of the estimation system according to the embodiment include a drive device and a rotary member that supports a stage, the axis of rotation of the rotary member intersect the object and be perpendicular to the optical axis of the optical path.

As shown in FIG. 10, the estimation system 30 has the angle changing mechanism 41. The angle changing mechanism 41 is provided for the measurement optical path $OP_{mea}$.

The angle changing mechanism 41 includes a drive device 42 and a rotary member 43. The rotary member 43 supports the stage 35. Axis RX in FIG. 10 is the axis of rotation of the rotary member 43. Axis RX intersects the object S and is perpendicular to the optical axis AX.

The rotary member 43 in the angle changing mechanism 41 is rotated by the drive device 42. Since the rotary member 43 supports the stage 35, rotation of the rotary member 43 causes rotation of the stage 35. The object S can be rotated about axis RX by rotating the stage 35.

The first illumination light and the second illumination light are reflected by the mirror 38 and incident on the object S. The rotation of the object S changes the orientation of the object S relative to the first illumination light and the orientation of the object S relative to the second illumination light. In consequence, the first illumination light and the second illumination light illuminate the object S from various directions.

The first measurement light $L_{mea1}$ and the second measurement light $L_{mea2}$ go out from the object S. The first measurement light $L_{mea1}$ and the second measurement light $L_{mea2}$ enter the light sensor 34.

In this estimation system 30, the direction of travel of the first illumination light and the direction of travel of the second illumination light do not change, but the orientation of the object S changes. Therefore, it is possible to change the angle of incidence of the first illumination light on the object S and the angle of incidence of the second illumination light on the object S.

It is preferred that the angle changing mechanism of the estimation system according to the embodiment include a drive device and a rotary member, the rotary member have a reflection surface whose orientation is changed by changing the angle of disposition of the rotary member.

Figure 11:
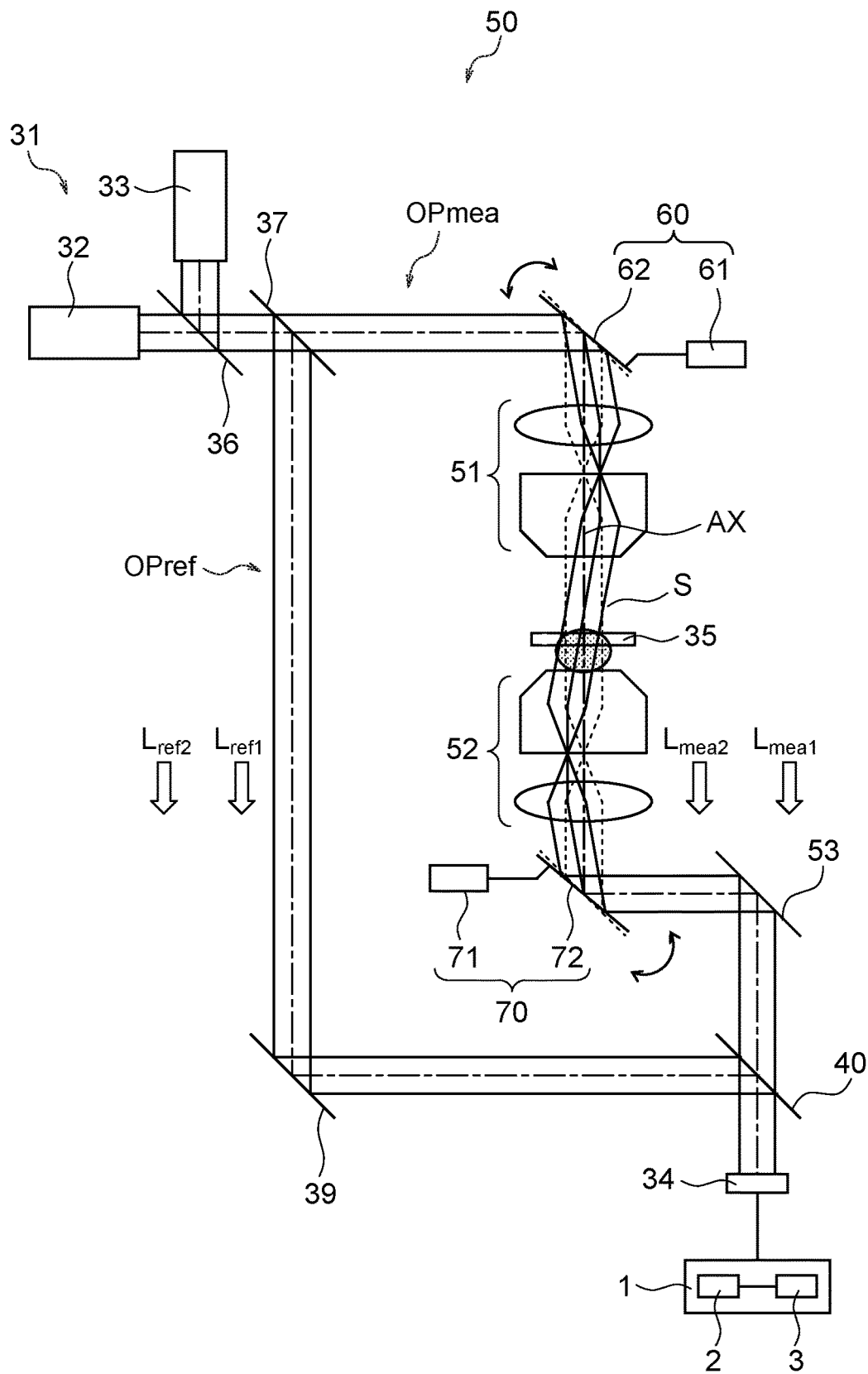
FIG. 11 is a diagram showing an estimation system according to the embodiment.

FIG. 11 is a diagram showing an estimation system according to the embodiment. The components similar to those shown in FIG. 10 are denoted by the same reference numerals and will not be described in further detail.

The estimation system 50 includes a first angle changing mechanism 60 and a second angle changing mechanism 70. The first angle changing mechanism 60 and the second angle changing mechanism 70 are provided for the measurement optical path $OP_{mea}$.

The first angle changing mechanism 60 includes a first drive device 61 and a first rotary member 62. The first rotary member 62 has a reflection surface. The orientation of the reflection surface changes with rotary motion or repetitive motion of the first rotary member 62. The second angle changing mechanism 70 includes a second drive device 71 and a second rotary member 72. The second rotary member 72 has a reflection surface. The orientation of the reflection surface changes with rotary motion or repetitive motion of the second rotary member 72.

For example, the first angle changing mechanism 60 is a galvanometer scanner or a polygon scanner. The galvanometer scanner changes the orientation of the reflection surface by repetitive motion of a plane mirror. The polygon scanner changes the orientation of the reflection surface by rotary motion of a polygon mirror. The galvanometer scanner and the polygon scanner are what is called a light deflector.

The estimation system 50 includes an illumination optical system 51, a stage 35, and a sensor optical system 52 disposed between the first angle changing mechanism 60 and the second angle changing mechanism 70. The object S is located between the illumination optical system 51 and the sensor optical system 52.

The first illumination light and the second illumination light pass through the illumination optical system 51 and enter the object S. The direction of travel of the first illumination light relative to the object S and the direction of travel of the second illumination light relative to the object S change with the rotary motion or the repetitive motion of the first rotary member 62. Therefore, the object S is illuminated with the first illumination light and the second illumination light from various directions.

The first measurement light $L_{mea1}$ and the second measurement light $L_{mea2}$ that go out from the object S pass through the sensor optical system 52 and are incident on the angle changing mechanism 70.

The angle of incidence of the first measurement light $L_{mea1}$ on the angle changing mechanism 70 changes. The angle of incidence of the second measurement light $L_{mea2}$ on the angle changing mechanism 70 also changes. The change in these angles of incidence can be cancelled by the angle changing mechanism 70. Thus, the first measurement light $L_{mea1}$ and the second measurement light $L_{mea2}$ are incident on the mirror 53 with no changes in the angle of incidence. The first measurement light $L_{mea1}$ and the second measurement light $L_{mea2}$ reflected by the mirror 53 are incident on the light sensor 34.

The estimation system 50 changes the direction of travel of the illumination light by the angle changing mechanism 60. In this case, the orientation of the object S is not changed, but the direction of travel of the first illumination light and the direction of travel of the second illumination light are changed. Thus, the estimation system 50 can change the angle of incidence of the first illumination light on the object S and the angle of incidence of the second illumination light on the object S.

The estimation system 50 causes the rotary members to rotate or move repetitively about one axis. Alternatively, the estimation system 50 may cause the rotary members to rotate or move repetitively about two axes that are perpendicular to each other.

The estimation systems 30 and 50 use two kinds of illumination light (i.e. the first illumination light and the second illumination light) but only one light sensor. Therefore, switching of the illumination light is required.

Figure 12A:
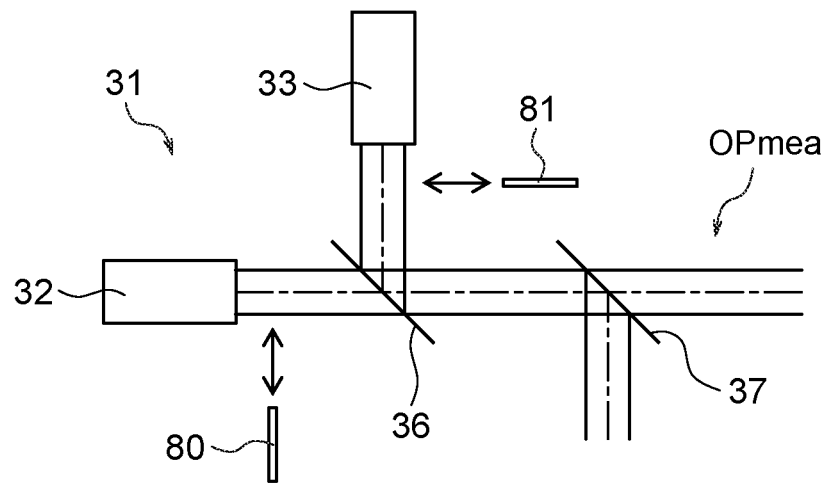
FIGS. 12A, 12B, and 12C are diagrams illustrating how to switch the illumination light.
Figure 12B:
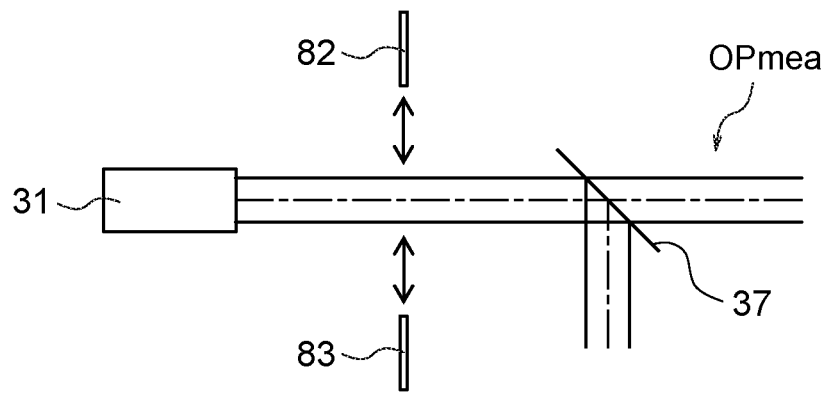
Figure 12C:
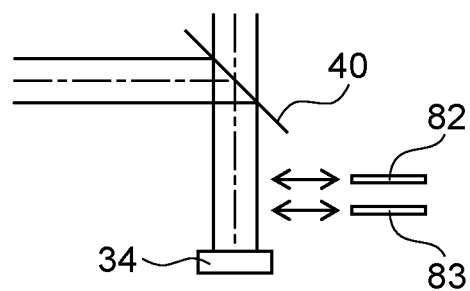

FIGS. 12A, 12B, and 12C illustrate how to switch the illumination light. The components the same as those shown in FIG. 10 are denoted by the same reference numerals and will not be described in further detail. FIG. 12A is a diagram illustrating a first switching method. FIG. 12B is a diagram illustrating a second switching method. FIG. 12C is a diagram illustrating a third switching method.

(First Switching Method)

As shown in FIG. 12A, the first method uses a first light blocking plate 80 and a second light blocking plate 81. The first light source 32 and the second light source 33 are kept on. The first light source 32 emits the first illumination light, and the second light source 33 emits the second illumination light.

The first light blocking plate 80 is disposed outside the optical path between the first light source 32 and the dichroic mirror 36. The second light blocking plate 81 is disposed outside the optical path between the second light source 33 and the dichroic mirror 36. The first light blocking plate 80 and the second light blocking plate 81 is adapted to be inserted into and removed from the optical path.

In one state, the first light blocking plate 80 is kept outside the optical path, and the second light blocking plate 81 is inserted in the optical path between the second light source 33 and the dichroic mirror 36. Thus, the first illumination light is selected in this state.

In the other state, the second light blocking plate 81 is kept outside the optical path, and the first light blocking plate 80 is inserted in the optical path between the first light source 32 and the dichroic mirror 36. Thus, the second illumination light is selected in this state.

(Second Method)

As shown in FIG. 12B, the second method uses a first optical filter 82 and a second optical filter 83. The light source unit 31 is kept on. The light source unit 31 has a single light source. The single light source emits the first illumination light and the second illumination light.

The first optical filter 82 and the second optical filter 83 are disposed outside the optical path between the light source unit 31 and the beam splitter 37. The first optical filter 82 and the second optical filter 83 are adapted to be inserted into and removed from the optical path.

The first optical filter 82 has spectral characteristics that transmit only the first illumination light. The second optical filter 83 has spectral characteristics that transmit only the second illumination light.

In one state, the first optical filter 82 is inserted in the optical path between the light source unit 31 and the beam splitter 37 while the second optical filter 83 is kept outside the optical path. Thus, the first illumination light is selected in this state.

In the other state, the second optical filter 83 is inserted in the optical path between the light source unit 31 and the beam splitter 37 while the first optical filter 82 is kept outside the optical path. Thus, the second illumination light is selected in this state.

In the case where the light source unit 3 includes two light sources as shown in FIG. 12A, the first optical filter 82 and the second optical filter 83 may be inserted into and removed from the optical path between the dichroic mirror 36 and the beam splitter 37.

(Third Method)

As shown in FIG. 12C, the third method uses a first optical filter 82 and a second optical filter 83. The first light source 32 and the second light source 33 are kept on.

The first optical filter 82 and the second optical filter 83 are disposed outside the optical path between the beam splitter 40 and the light sensor 34. The first optical filter 82 and the second optical filter 83 are adapted to be inserted into and removed from the optical path.

In one state, the first optical filter 82 is inserted in the optical path between the beam splitter 40 and the light sensor 34 while the second optical filter 83 is kept outside the optical path. Thus, the first illumination light is selected in this state.

In the other state, the second optical filter 83 is inserted in the optical path between the beam splitter 40 and the light sensor 34 while the first optical filter 82 is kept outside the optical path. Thus, the second illumination light is selected in this state.

It is preferred that the estimation system according to the embodiment include a first light sensor and a second light sensor, the first light sensor have a sensitivity equal to or higher than a first threshold in the wavelength band of the first illumination light, but do not have a sensitivity equal to or higher than the first threshold in the wavelength band of the second illumination light, the second light sensor have a sensitivity equal to or higher than a second threshold in the wavelength band of the second illumination light, but do not have a sensitivity equal to or higher than the second threshold in the wavelength band of the first illumination light.

Figure 13:
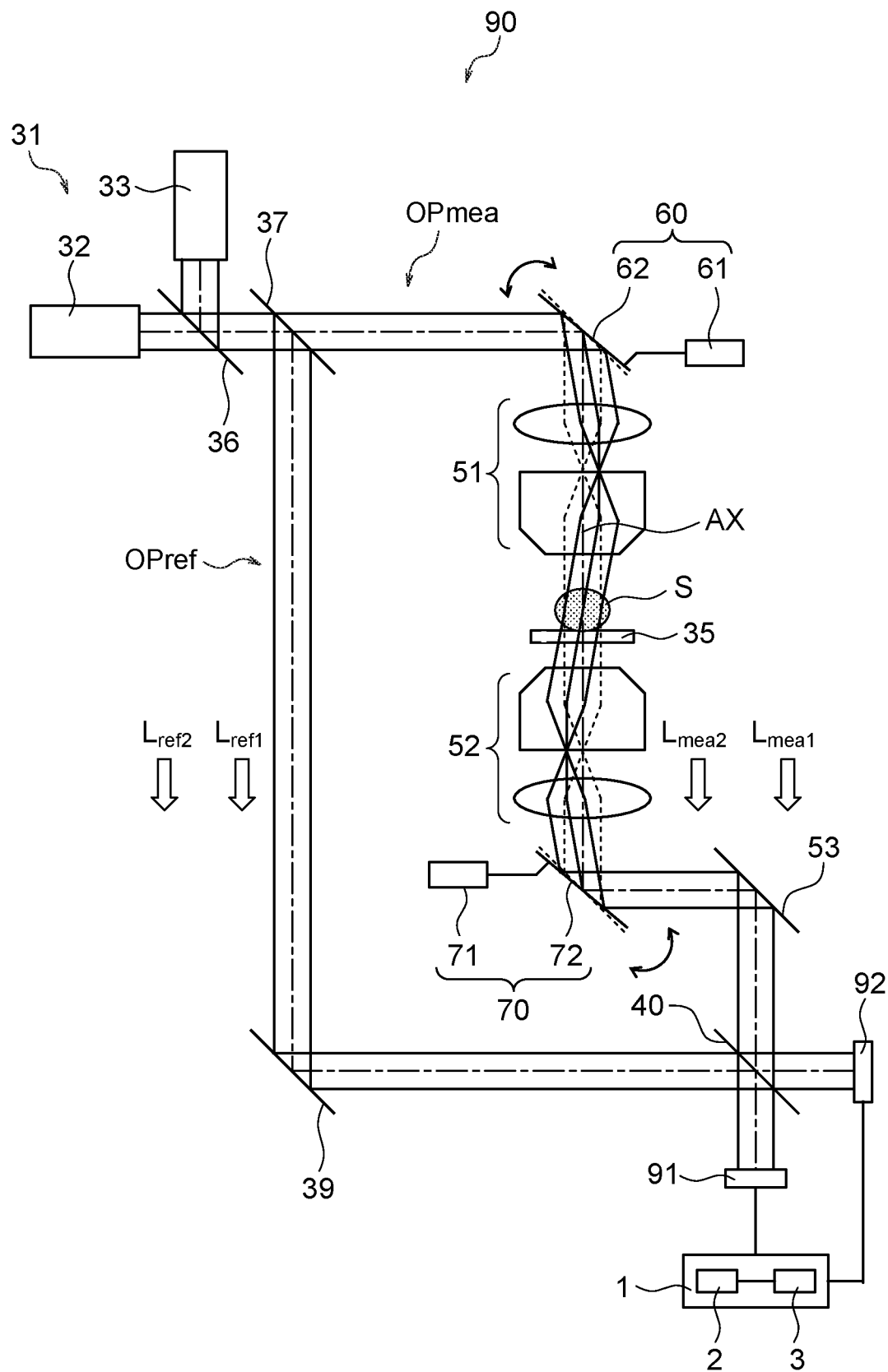
FIG. 13 is a diagram showing an estimation system according to the embodiment.

FIG. 13 is a diagram showing an estimation system according to the embodiment. The components that are similar to those in FIG. 11 are denoted by the same reference numerals and will not be described in further detail.

The estimation system 90 shown in FIG. 13 includes a first light sensor 91 and a second light sensor 92. While the first light source 32 and the second light source 33 are on, the first measurement light $L_{mea1}$, the second measurement light $L_{mea2}$, the first reference light $L_{ref1}$, and the second reference light $L_{ref2}$ are incident on the first light sensor 91 and the second light sensor 92.

The first light sensor 91 has a sensitivity higher than the first threshold in the wavelength band of the first illumination light, but does not have a sensitivity higher than the first threshold in the wavelength band of the second illumination light. Therefore, the first light sensor 91 can capture images of only the first interference fringes that are formed with the first measurement light $L_{mea1}$ and the first reference light $L_{ref1}$. The first threshold may be determined fitly.

The second light sensor 92 has a sensitivity higher than the second threshold in the wavelength band of the second illumination light, but does not have a sensitivity higher than the second threshold in the wavelength band of the first illumination light. Therefore, the second light sensor 92 can capture images of only the second interference fringes that are formed with the second measurement light $L_{mea2}$ and the second reference light $L_{ref2}$. The second threshold may be determined fitly.

It is preferred that the estimation system according to the embodiment include a first light sensor, a second light sensor, a first optical element used with the first light sensor, and a second optical element used with the second light sensor, the first optical element have characteristics that transmit the first illumination light but block the second illumination light, and the second optical element have characteristics that transmit the second illumination light but block the first illumination light.

Figure 14:
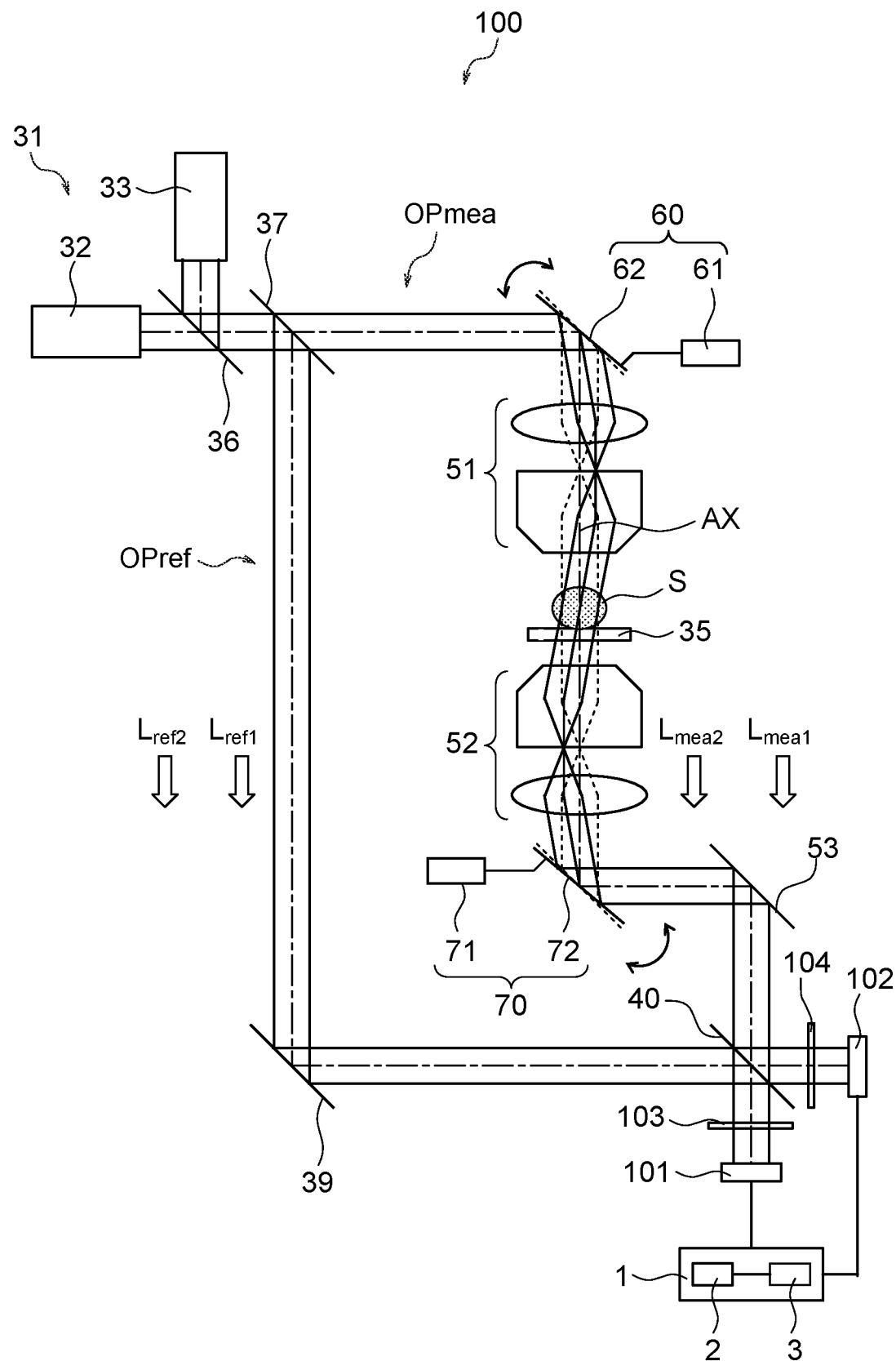
FIG. 14 is a diagram showing an estimation system according to the embodiment.

FIG. 14 is a diagram showing an estimation system according to the embodiment. The components that are similar to those in FIG. 11 are denoted by the same reference numerals and will not be described in further detail.

The estimation system 100 includes a first light sensor 101, a second light sensor 102, a first optical element 103, and a second optical element 104.

The first optical element 103 is disposed between the beam splitter 40 and the first light sensor 101. The second optical element 104 is disposed between the beam splitter 40 and the second light sensor 102.

While the first light source 32 and the second light source 33 are on, the first measurement light $L_{mea1}$, the second measurement light $L_{mea2}$, the first reference light $L_{ref1}$, and the second reference light $L_{ref2}$ are incident on the first optical element 103 and the second optical element 104.

The first optical element 103 has characteristics that transmit the first illumination light but blocks the second illumination light. Therefore, the first measurement light $L_{mea1}$ and the first reference light $L_{ref1}$ are incident on the first light sensor 101. The first measurement light $L_{mea1}$ and the first reference light $L_{ref1}$ form first interference fringes. An image of the first interference fringes can be obtained by imaging the first interference fringes by the first light sensor 101.

The second optical element 104 has characteristics that transmit the second illumination light but blocks the first illumination light. Therefore, the second measurement light $L_{mea2}$ and the second reference light $L_{ref2}$ are incident on the second light sensor 102. The second measurement light $L_{mea2}$ and the second reference light $L_{ref2}$ form second interference fringes. An image of the second interference fringes can be obtained by imaging the second interference fringes by the second light sensor 102.

Figure 15:
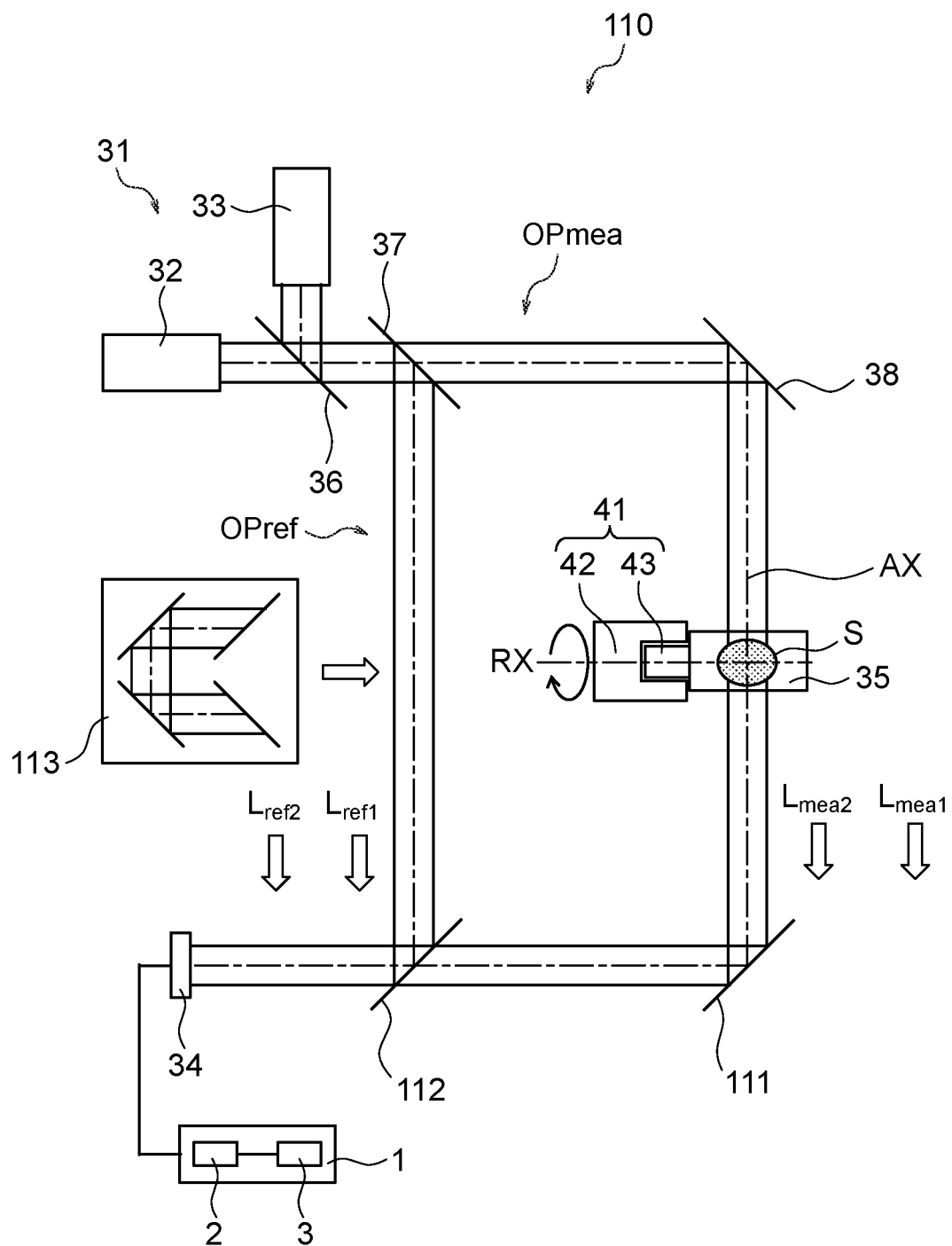
FIG. 15 is a diagram showing an estimation system according to the embodiment.

FIG. 15 is a diagram showing an estimation system according to the embodiment. The components that are similar to those in FIG. 10 are denoted by the same reference numerals and will not be described in further detail.

The estimation system 110 includes a mirror 111 and a beam splitter 112. The mirror 111 is disposed in the measurement optical path $OP_{mea}$. The beam splitter 112 is disposed at the location at which the reference optical path $OP_{ref}$ and the measurement optical path $OP_{mea}$ intersect with each other.

In the estimation system 30 shown in FIG. 10, the measurement optical path $OP_{mea}$ is bent to the direction opposite to the first direction by the beam splitter 40, and the reference optical path $OP_{ref}$ is bent to the direction opposite to the first direction by the mirror 39.

In the case of the estimation system 110, the measurement optical path $OP_{mea}$ is bent to the first direction by the mirror 111, and the reference optical path $OP_{ref}$ is bent to the first direction by beam splitter 112. Therefore, there is a difference between the optical path length of the measurement optical path $OP_{mea}$ and the optical path length of the reference optical path $OP_{ref}$.

Interference fringes are formed when the coherence length of the illumination light is longer than the difference between the optical path lengths. If the coherence length of the illumination light is shorter than the difference between the optical path lengths, an optical length adjuster 113 is provided between the beam splitter 37 and the mirror 112. Interference fringes can be formed with this arrangement.

For example, the optical path length adjuster 113 has a piezo stage and four mirrors. Two mirrors are disposed on the piezo stage. The optical path length of the reference optical path $OP_{ref}$ can be changed by moving the two mirrors. Image capturing may be performed multiple times to calculate wave front information while driving the piezo stage at steps shorter than the wavelength of the light source.

An estimation system according to the embodiment includes the estimation apparatus according to the embodiment, and a light source unit that emits the first illumination light and the second illumination light. The light source unit includes a plurality of independent light sources having different illumination angles. A processor of the estimation apparatus or another processor controls the light sources to turn the emission of illumination light on and off, thereby changing the angle of incidence of the first illumination light on the object and the angle of incidence of the second illumination light on the object.

Figure 16:
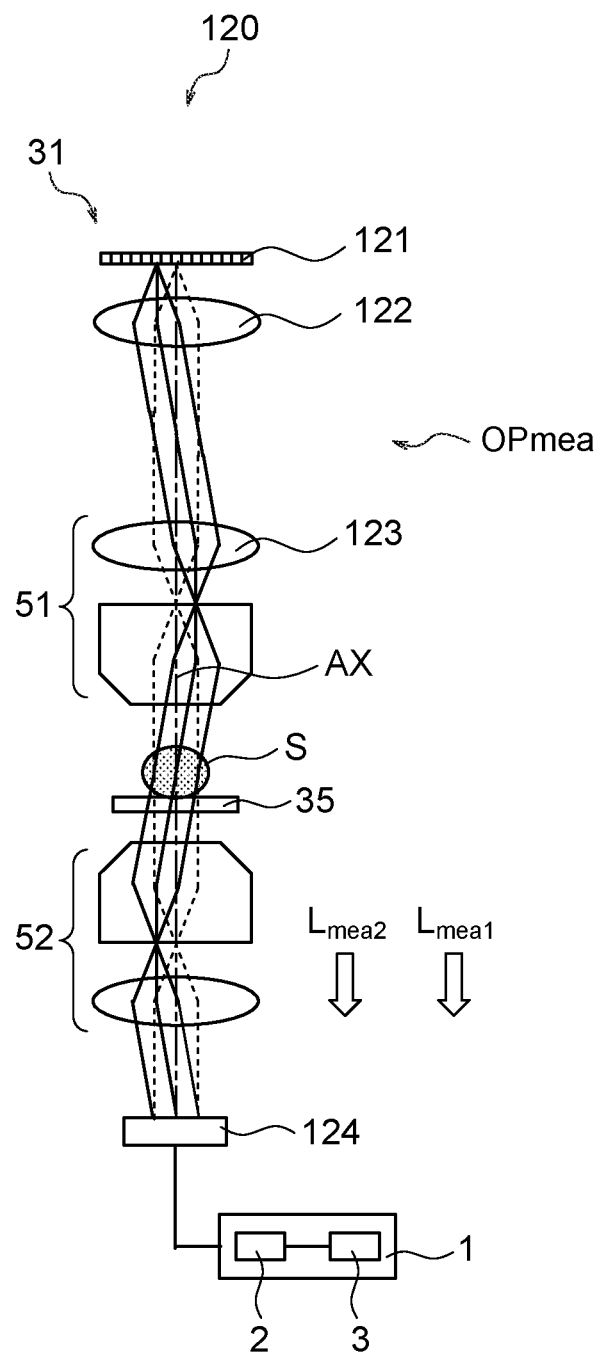
FIG. 16 is a diagram showing an estimation system according to the embodiment.

FIG. 16 is a diagram showing the estimation system according to the embodiment. The components that are similar to those in FIG. 11 are denoted by the same reference numerals and will not be described in further detail.

The estimation system 120 includes a light source 121, a first lens 122, a second lens 123, and a light sensor 124. The second lens 123 is provided in the illumination optical system 51. This estimation system 120 has only a measurement optical path $OP_{mea}$.

The light source 121 has a first illumination unit and a second illumination unit. Each of the first and second illumination units has a plurality of light emitting parts. For example, the light emitting part may be provided with a light emitting diode (LED) or a laser diode (LD).

The light emitting parts may be arranged in an array. The light emitting parts can be controlled independently from each other to turn on and off of the light emission. The first illumination unit emits the first illumination light. The second illumination unit emits the second illumination light.

The light emitting parts may be the light emission surface of a fiber bundle. The fiber bundle includes a first fiber bundle and a second fiber bundle. The first fiber bundle is connected with a first light source (not shown), so that the first illumination light is emitted from the light emission surface of the first fiber bundle. The second fiber bundle is connected with a second light source (not shown), so that the second illumination light is emitted from the light emission surface of the second fiber bundle.

It is preferred that the object S be illuminated with parallel light. The area of the light emitting part of the light source 121 is small enough to be considered a point light source. For this reason, the light emitting part is disposed at a location conjugate with the location of the pupil of the illumination optical system 51.

The first lens 122 is disposed between the light source 121 and the illumination optical system 51. The first lens 122 and the second lens 123 can make the location of the light source 121 and the location of the pupil of the illumination optical system 51 conjugate with each other. If it is possible to provide a sufficient space around the location of the pupil of the illumination optical system 51, the light emitting part may be disposed at the location of the pupil of the illumination system 51.

The light source 121 controls the first illumination unit and the second illumination unit. Specifically, the light emitting part among the plurality of light emitting part that is used to emit light is changed by this control. This control can change the angle of incidence of the first illumination light on the object and the angle of incidence of the second illumination light on the object.

The light source 121 can be considered a light source unit that emits the first illumination light and the second illumination light. Each of the first and second illumination lights has a plurality of light emitting parts. This means that the light source unit has multiple individual light sources having different illumination angles.

The estimation apparatus 120 has a processor or a processor other than the processor. The processor can control the light source unit to turn the emission of illumination light on and off. This control can change the angle of incidence of the first illumination light on the object and the angle of incidence of the second illumination light on the object.

The estimation system 120 has only one optical path, and therefore it cannot obtain phase information directly from interference fringes.

Therefore, the estimation system 120 measures amplitude data of the wave front. The wave front measured is the wave front on the sensing surface of the light sensor 124. The measurement of the amplitude data of the wave front may be performed at a plurality of wavelengths or while changing the illumination angle. In the case where the illumination angle is changed during the measurement, the illumination angle is changed in small steps. The estimation system 120 can obtain a set of data that is needed to estimate the phase of the wave front on the sensing surface by using the above measurement methods.

Since the estimation system 120 does not need a reference optical path, its structure can be made simpler.

Figure 17A:
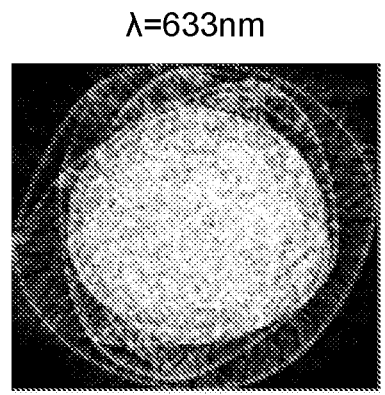
FIGS. 17A, 17B, and 17C show images of an object.
Figure 17B:
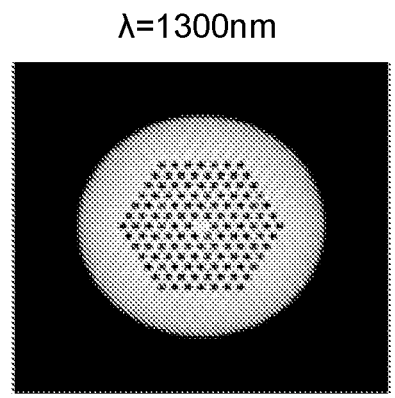
Figure 17C:
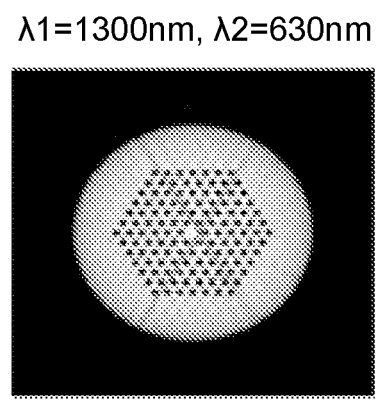

FIGS. 17A, 17B, and 17C show images of an object. FIG. 17A is an image obtained by estimation using the first wave front information. FIG. 17B is an image obtained by estimation using the second wave front information. FIG. 17C is an image obtained by estimation using the first wave front information and the second wave front information. These images were obtained by simulation.

In the simulation, a photonic crystal fiber (which will be referred to as "PCF" hereinafter) is used as the object. The PCF is cylindrical element having through holes.

The PCF is a cylindrical element having through holes in it. Each through hole has a cylindrical shape and extends parallel to the generating line of the cylindrical element. The outer diameter of the PCF is 230 μm, and the refractive index of the medium is 1.47. The through holes and the space around the cylindrical element are filled with a liquid having a refractive index of 1.44.

The image shown in FIG. 17A was obtained by estimation using wave front information that was obtained with illumination light having a wavelength A of 633 nm. The image shown in FIG. 17B was obtained by estimation using wave front information that was obtained with illumination light having a wavelength A of 1300 nm.

The longest wave length in the wavelength band of the second illumination light is shorter than the shortest wavelength in the wavelength band of the first illumination light. The image shown in FIG. 17A was obtained by estimation using wave front information that was obtained with the second illumination light, namely the second wave front information. The image shown in FIG. 17B was obtained by estimation using wave front information that was obtained with the first illumination light, namely the first wave front information.

As described above, the amount of wave front information with respect to the axial direction is smaller in the second wave front information than in the first wave front information. For this reason, the structure of the PCF can be estimated little as shown in FIG. 17A. In other words, the amount of wave front information with respect to the axial direction is larger in the first wave front information than in the second wave front information. For this reason, the structure of the PCF can be estimated roughly as shown in FIG. 17B.

The image shown in FIG. 17C was obtained by estimation using wave front information that was obtained with the illumination light having a wavelength $\lambda 1$ of 1300 nm and wave front information that was obtained with the illumination light having a wavelength $\lambda 2$ of 633 nm. The image shown in FIG. 17C was obtained by estimation using the first wave front information and the second wave front information.

The amount of wave front information with respect to the lateral direction is larger in the second wave front information than in the first wave front information. Therefore, the accuracy of estimation can be improved by using both the first wave front information and the second wave front information in the estimation. As shown in FIG. 17C, the image obtained by estimation using the first wave front information and the second wave front information can show the structure of the PCF more clearly with respect to the lateral direction.

Figure 18B:
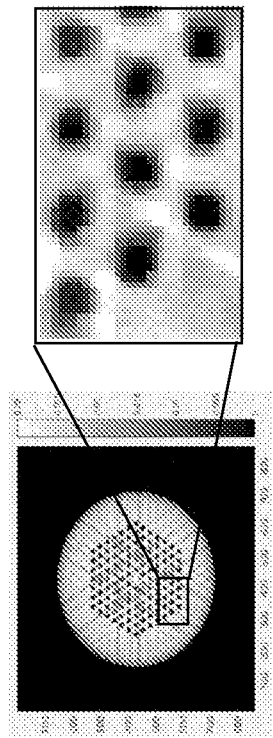
FIGS. 18A, 18B, 18C, and 18D are images of an object.
Figure 18D:
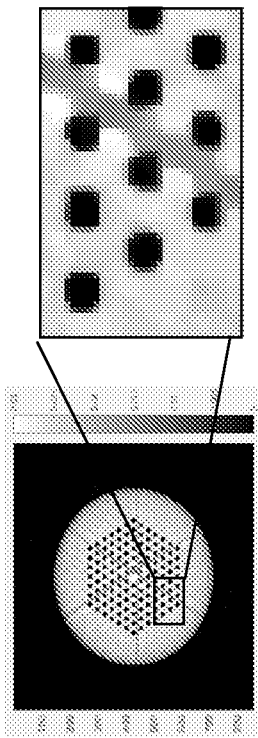
Figure 18A:
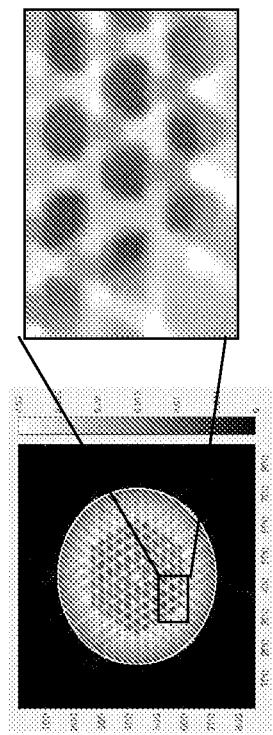
Figure 18C:
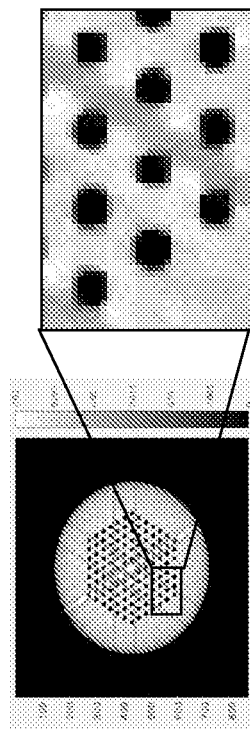

FIGS. 18A, 18B, 18C, and 18D are images of an object. FIGS. 18A and 18B are images obtained by estimation using the first wave front information. FIGS. 18C and 18D are images obtained by estimation using the first wave front information and the second wave front information. These images were obtained by simulation.

The estimation of the images shown in FIGS. 18A and 18C used wave front information obtained by a sensor optical system having a numerical aperture NA of 0.1. The estimation of the images shown in FIGS. 18B and 18D used wave front information obtained by a sensor optical system having a numerical aperture NA of 0.2.

Increases in the numerical aperture NA of optical systems lead to increases in the resolution. Increases in the resolution lead to increases in the amount of wave front information. When the amount of wave front information is large, it is possible to estimate the three-dimensional optical property of the object with high accuracy.

The estimation of the image shown in FIG. 18B can use a larger amount of wave front information than the estimation of the image shown in FIG. 18A. Therefore, the image shown in FIG. 18B shows the structure of the PCF more clearly than the image shown in FIG. 18A.

The estimation of the image shown in FIG. 18D can use a larger amount of wave front information than the estimation of the image shown in FIG. 18C. Therefore, the image shown in FIG. 18D shows the structure of the PCF more clearly than the image shown in FIG. 18C.

The images shown in FIGS. 18A and 18B were obtained by estimation using wave front information that was obtained with illumination light having a wavelength λ of 1300 nm. The images shown in FIGS. 18C and 18D were obtained by estimation using wave front information that was obtained with illumination light having a wavelength λ1 of 1300 nm and wave front information that was obtained with illumination light having a wavelength λ2 of 633 nm.

Increases in the number of wavelengths lead to increases in the amount of wave front information. When the amount of wave front information is large, it is possible to estimate the three-dimensional optical property of the object with high accuracy. The images shown in FIGS. 18C and 18D were obtained by estimation using wave front information that was obtained with illumination light having a wavelength shorter than 1300 nm.

Illumination light having shorter wave lengths has higher resolution than illumination light having longer wave lengths. Therefore, the use of the wave length information that was obtained with illumination light having a wavelength shorter than 1300 nm can result in the use of a larger amount of information in the estimation than the wave front information that was obtained with illumination light having a wavelength of 1300 nm.

The estimation of the image shown in FIG. 18C can use a larger amount of wave front information than the estimation of the image shown in FIG. 18A. Therefore, the image shown in FIG. 18C shows the structure of the PCF more clearly than the image shown in FIG. 18A.

The estimation of the image shown in FIG. 18D can use a larger amount of wave front information than the estimation of the image shown in FIG. 18B. Therefore, the image shown in FIG. 18D shows the structure of the PCF more clearly than the image shown in FIG. 18B.

An estimation system according to the embodiment includes the estimation apparatus according to the embodiment, a light source unit that emits the first illumination light and the second illumination light, an imaging optical system that forms an image of an object, a light sensor that obtains an image of the object from an optical image of the object, and a drive mechanism that changes the distance between the location of the focal point of the imaging optical system and the location of the object along the optical axis of the imaging optical system. The illumination with the first illumination light and the illumination with the second illumination light constitute spatially partial coherent illumination of the object.

Figure 19:
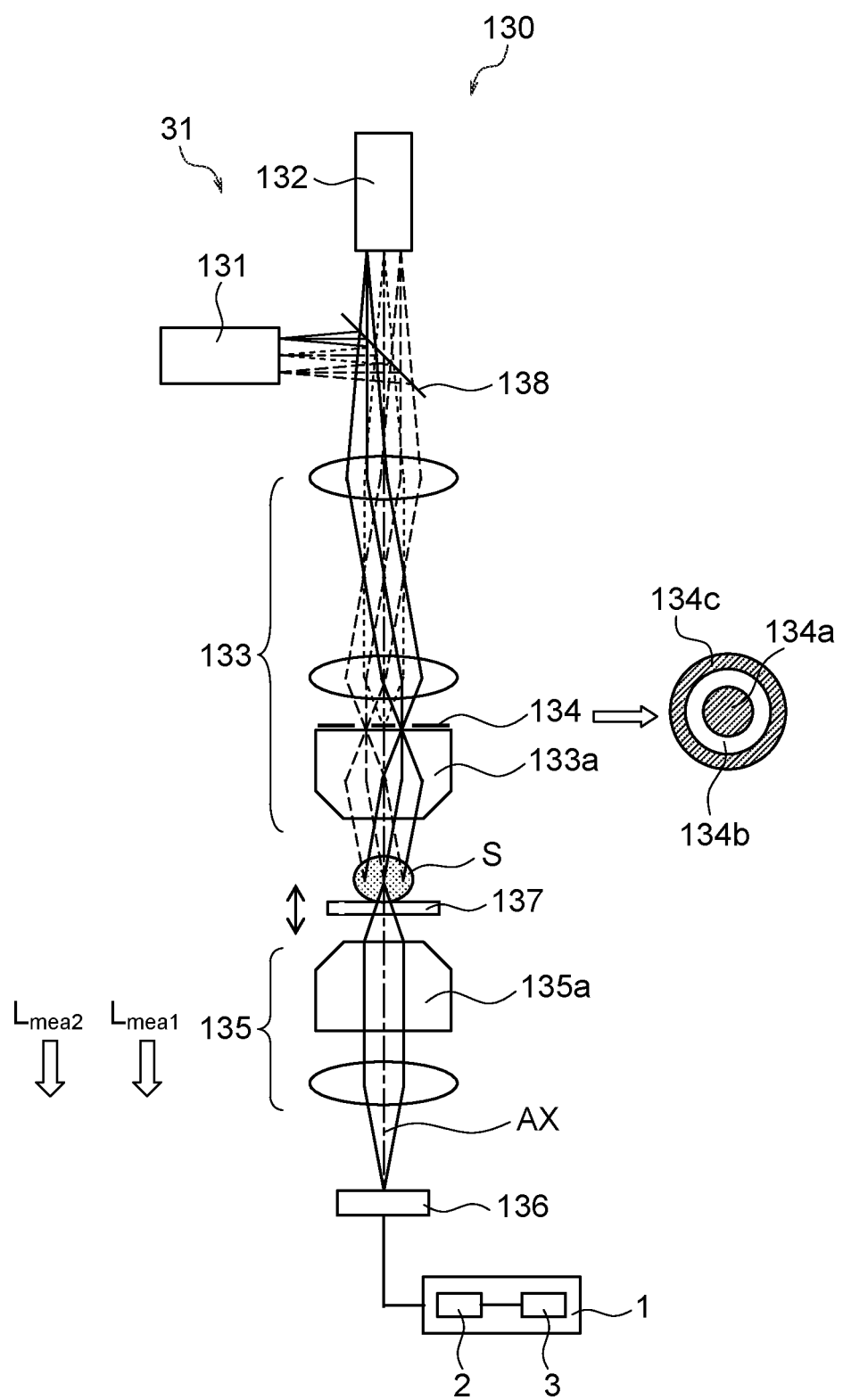
FIG. 19 is a diagram showing an estimation system according to the embodiment.

FIG. 19 is a diagram showing an estimation system according to the embodiment. The components that are similar to those in FIG. 11 are denoted by the same reference numerals and will not be described in further detail.

The estimation system 130 shown in FIG. 19 includes a light source unit 31, an illumination optical system 133, an aperture member 134, an imaging optical system 135, a light sensor 136, a drive mechanism 137, and an estimation apparatus 1. The estimation apparatus 1 has a memory 2 and a processor 3. The estimation apparatus has a memory 2 and a processor 3.

The light source unit 31 emits the first illumination light and the second illumination light. The light source unit 31 in the estimation system 130 has a first light source 131 and a second light source 132. The first light source 131 emits the first illumination light. The second light source 132 emits the second illumination light. It is preferred that the first illumination light and the second illumination light each be quasi-monochromatic light. The quasi-monochromatic light refers to light having a narrow wavelength bandwidth. For example, light emitting diodes (LED) may be used as the first light source 131 and the second light source 132.

A light source that emits light having a wide wavelength bandwidth may be used instead of an LED. In this case, two narrow band optical filters may be inserted into and removed from the optical path between the dichroic mirror 138 and the illumination optical system 133. As these two narrow band optical filters, the first optical filter 82 and the second optical filter 83 shown in FIG. 12B may be used. The narrow band optical filters are not required to have highly accurate spectral transmission characteristics.

The light emitted from the first light source 131 may be infrared light, and the light emitted from the second light source 132 may be visible light.

The first illumination light and the second illumination light enter the dichroic mirror 138. The dichroic mirror 138 has spectral characteristics that transmit long wavelength light and reflect short wavelength light. Therefore, the first illumination light is transmitted through the dichroic mirror 138, and the second illumination light is reflected by the dichroic mirror 138.

Then, the first illumination light and the second illumination light enter the illumination optical system 133. The illumination optical system 133 illuminates the object S.

The aperture member 134 is provided in the illumination optical system 133. The aperture member 134 has a circular light blocking portion 134a, an annular light transmitting portion 134b, and an annular light blocking portion 134c. The light transmitting portion 134b may be a light attenuation part.

Another aperture member may also be prepared in addition to the aperture member 134 to use two aperture members in the estimation system 130. In this case, the other aperture member has a light transmitting part the same as the transmitting part 134b of the aperture member 134 and two light blocking parts the same as the light blocking parts 134a and 134c of the aperture member 134. The first optical filter 82 is provided in the light transmitting portion 134b of the aperture member 134, and the second optical filter 83 is provided in the light transmitting portion of the other aperture member.

In the case where the two aperture members are used, it is not necessary to use the two narrow band optical filters that are inserted into and removed from the optical path between the dichroic mirror 138 and the illumination optical system 133.

An image of the light emitting part of the first light source 131 and an image of the light emitting part of the second light source 132 are formed on the aperture member 134. The first light source 131 and the second light source 132 are surface light sources. The light emitting part of the surface light source is composed of an infinite numbers of point light sources. It may be considered that an infinite number of point light sources are present on the aperture member 134.

The first illumination light and the second illumination light are emitted from the images of the point light sources that are formed in the light transmitting portion 134b of the aperture member 134. However, the first illumination light and the second illumination light are not emitted from the images of the point light sources that are formed in the light blocking portions 134a and 134c of the aperture member 134. Therefore, the illumination with the first illumination light and the illumination with the second illumination light is partial coherent illumination.

The partial coherent illumination is intermediate illumination between the coherent illumination and the incoherent illumination. The coherent illumination is the illumination with light emitted from a point light source. An example of the coherent illumination is the illumination with laser light. The incoherent illumination is the illumination with light emitted from a surface light source. An example of the incoherent illumination is the illumination with light emitted from a halogen lamp.

Even in the case where a surface light source is used, restricting the light emitting area small makes the surface light source similar to a point light source. Light sources for the partial coherent illumination are intermediate light sources between surface light sources and point light sources.

The aperture member 134 is disposed at the front focal point of a lens 133a. Therefore, the beams that go out from the illumination optical system 133 are parallel beams. The object S is illuminated with parallel light.

The imaging optical system 135 forms an optical image of the object S. An image of the object S can be obtained by imaging the optical image by the light sensor 136. As the light sensor 136, a two-dimensional sensor such as a CCD or CMOS sensor may be used.

The estimation system 130 may use two optical sensors as with the estimation system 100 shown in FIG. 14. In this case, an Si sensor may be used as one light sensor, and an InGaAs sensor may be used as the other light sensor.

The drive mechanism 137 changes the distance between the location of the focal point of the imaging optical system 135 and the location of the object S along the direction parallel to the optical axis AX. The driving mechanism 137 used in the estimation system 130 is a stage. While the imaging optical system 135 is fixed, the stage is moved in the direction parallel to the optical axis AX. Thus, the location of the object S can be changed relative to the location of the focal point of the imaging optical system 135.

Instead of moving the stage, the imaging optical system 135 and the light sensor 136 may be moved in the direction parallel to the optical axis AX. The location of the object S can be changed relative to the location of the focal point of the imaging optical system by this method also.

An infinity-corrected microscope objective lens can be used as a lens 135a in the imaging optical system 135. In this case, light that goes out from this lens 135 is parallel light. Therefore, only this lens 135a may be moved in the direction parallel to the optical axis AX.

Images of the object S are obtained with the distance between the location of the focal point of the imaging optical system 135 and the location of the object S being varied. Thus, a plurality of images can be obtained. A plurality of pieces of wave front information can be obtained from the plurality of images. The plurality of pieces of wave front information include information with respect to the axial direction with both the first illumination light and the second illumination light.

The light transmitting part 134b does not contain the optical axis AX. Therefore, the object S is illuminated with parallel light from a direction transverse to the optical axis. Therefore, images of the object having contrast can be obtained. Since the partial coherent illumination is used, it is possible to obtain images of the object with higher resolution than in the case where the coherent illumination is used.

While the estimation system 130 uses one aperture member, a plurality of aperture members may be used. Different pieces of wave front information can be obtained by changing the size of the light blocking portion 134a and the width of the annular light transmitting portion 134b.

FIGS. 20A, 20B, and 20C show aperture members and images of an object. FIG. 20A shows a first aperture member and an image of the object. FIG. 20B shows a second aperture member and an image of the object. FIG. 20C shows a third aperture member and an image of the object. These images are obtained by simulation.

The first, second and third aperture members have an annular light transmitting portion. The position and the width of the light transmitting portion vary among the aperture members. Therefore, wave front information obtained with the aperture members vary among them.

The wave front information obtained from the captured images contains information related to spatial frequencies. The more distant the light transmitting portion is from the center of the aperture member, the larger the angle of incidence of the illumination light on the object is. As the angle of incidence increases, the amount of information on high frequency components becomes larger than the amount of information on low frequency components. When the amount of information on high frequency components is large, details of the structure of the object is enhanced in the images of the object.

The distance of the light transmitting portion from the center increases in the order of the first aperture member, the second aperture member, and the third aperture member. Therefore, the clarity of details of the structure increases in the order of the image in FIG. 20A, the image in FIG. 20B, and the image in FIG. 20C.

As above, the estimation system 130 can obtain a large amount of wave front information. Therefore, it can determine the three-dimensional optical property of the object with high accuracy and high spatial resolution, even in the case where the thickness of the object is large.

An estimation method according to the embodiment is a method for estimating a three-dimensional optical property of an object. The three-dimensional optical property is the refractive index distribution or the absorbance distribution. First wave front information is information on the wave front that is obtained based on first illumination light that has passed through an object, and second wave front information is information on the wave front that is obtained based on second illumination light that has passed through the object. The wavelength at which the intensity of the second illumination light is highest is shorter than the wavelength at which the intensity of the first illumination light is highest. The estimation process is performed using both the first wave front information and the second wave front information.

The estimation process is performed by a computer. The computer reads out the first wave front information and the second wave front information stored in a memory and performs the estimation process.

It is preferred in the estimation method according to the embodiment that the estimation process be performed using both multiple pieces of first wave front information and multiple pieces of second wave front information, and the multiple pieces of first wave front information be different from each other in terms of the angle of incidence of the first illumination light on the object, and the multiple pieces of second wave front information be different from each other in terms of the angle of incidence of the second illumination light on the object.

The estimation process performed according to the estimation method according to the embodiment includes a first optimization process that uses the first wave front information as a constraint, and a second optimization process that uses the second wave front information as a constraint. Each of the first optimization process and the second optimization process is performed two or more times. The second optimization process is consecutively performed on the three-dimensional optical property that has been refined by the first optimization process that have been performed consecutively.

In the estimation process performed according to the estimation method according to the embodiment, the second optimization process is performed on the three-dimensional optical property that has been refined by the first optimization process.

The estimation process performed according to the estimation method according to the embodiment includes a first optimization process that uses the first wave front information as a constraint, and a second optimization process that uses the second wave front information as a constraint. In the estimation process, a combined process consisting of a first optimization process and a second optimization process is performed two or more times. In the combined process, the first optimization process is performed first. In the combined process, the first optimization process is not performed after the second optimization process is performed.

In the combined process performed according to the estimation method according to the embodiment, the first optimization process is performed on an initial value set for the three-dimensional optical property.

In the estimation method according to the embodiment, the number of times of performing the first optimization process is controlled equal to or larger than the number of times of performing the second optimization process.

It is preferred in the estimation method according to the embodiment that the control continue through the consecutive combined processes.

In the estimation method according to the embodiment, the control of decreasing the difference between the number of times of performing the second optimization process and the number of times of performing the first optimization process in the combined process is performed after the combined process is performed a predetermined number of times.

The first illumination light used in the estimation method according to the embodiment is light in the infrared range, and the second illumination light is light in the visible range.

The first illumination light used in the estimation method according to the embodiment is light in the infrared range, and satisfies the following condition (A):

$$2 \times \lambda 2 < \lambda 1 \qquad (A),$$

where $\lambda 1$ is the wavelength of the first illumination light, and $\lambda 2$ is the wavelength of the second illumination light.

A recording medium according to the embodiment is a computer-readable recording medium in which a program is recorded. The recording medium stores a program configured to cause a computer that has a memory and a processor to perform an estimation process. The memory stores first wave front information and second wave front information. The first wave front information is information on the wave front that is obtained based on first illumination light that has passed through an object, and the second wave front information is information on the wave front that is obtained based on second illumination light that has passed through the object. The wavelength at which the intensity of the second illumination light is highest is shorter than the wavelength at which the intensity of the first illumination light is highest. The three-dimensional optical property is the refractive index distribution or the absorbance distribution. The computer causes the processor to perform the processing of reading out the first wave front information and the second wave front information from the memory and the estimation process using both the first wave front information and second wave front information.

It is preferred that the program stored in the recording medium according to the embodiment be configured to cause the processor to perform the estimation process using multiple pieces of first wave front information and multiple pieces of second wave front information that are stored in the memory. The multiple pieces of first wave front information are different from each other in terms of the angle of incidence of the first illumination light on the object, and the multiple pieces of second wave front information are different from each other in terms of the angle of incidence of the second illumination light on the object.

As above, the present invention is suitably applied to an estimation apparatus, an estimation system, an estimation method, and a recording medium to determine a three-dimensional optical property of an object with high accuracy and high spatial resolution even in the case where the thickness of the object is large.

The present invention can provide an estimation apparatus, an estimation system, an estimation method, and a recording medium that can determine a three-dimensional optical property of an object with high accuracy and high spatial resolution even in the case where the thickness of the object is large.

What is claimed is:

1. An estimation system comprising:
a memory;
a hardware processor;
a light source unit configured to emit first illumination light and second illumination light;
a light sensor; and
a stage,
wherein:
the stage is disposed in an optical path between the light source unit and the light sensor,
the memory stores first wave front information and second wave front information,
the first wave front information is information on a wave front that is obtained by the light sensor based on the first illumination light that has passed through an object placed on the stage,
the second wave front information is information on a wave front that is obtained by the light sensor based on the second illumination light that has passed through the object,
a wavelength at which an intensity of the second illumination light is highest is shorter than a wavelength at which an intensity of the first illumination light is highest,
the processor is configured to perform an estimation process of estimating a three-dimensional optical property of the object,
the three-dimensional optical property is a refractive index distribution or an absorbance distribution,
the estimation process includes a first optimization process that uses the first wave front information as a constraint and a second optimization process that uses the second wave front information as a constraint, the first optimization process includes a process of correcting estimated wave front information based on the first wave front information and the estimated wave front information, the second optimization process includes a process of correcting the estimated wave front information based on the second wave front information and the estimated wave front information, and the processor performs the first optimization process multiple times and performs the second optimization process multiple times.

2. The estimation system according to claim 1, wherein:
the memory stores multiple pieces of the first wave front information and multiple pieces of the second wave front information,
the multiple pieces of first wave front information are different from each other in terms of an angle of incidence of the first illumination light on the object,
the multiple pieces of second wave front information are different from each other in terms of an angle of incidence of the second illumination light on the object, and
the estimation process uses both the multiple pieces of the first wave front information and the multiple pieces of the second wave front information.

3. The estimation system according to claim 1, wherein the processor is configured to consecutively perform the second optimization process on the three-dimensional optical property that has been updated by the first optimization process that has been performed consecutively.

4. The estimation system according to claim 3, wherein the processor is configured to consecutively perform the first optimization process on an initial value set for the three-dimensional optical property.

5. The estimation system according to claim 1, wherein the processor is configured to perform a combined process consisting of the first optimization process and the second optimization process two or more times, the first optimization process being performed first in the combined process, and the first optimization process not being performed after the second optimization process is performed.

6. The estimation system according to claim 5, wherein the processor is configured to perform the combined process on an initial value set for the three-dimensional optical property.

7. The estimation system according to claim 5, wherein the processor is configured to perform control such that a number of times that the first optimization process is performed in the combined process is equal to or greater than a number of times that the second optimization process is performed in the combined process.

8. The estimation system according to claim 7, wherein the processor is configured to perform the control through consecutive combined processes.

9. The estimation system according to claim 8, wherein the processor is configured to, after performing the combined process a predetermined number of times, perform control of the combined process so as to decrease a difference between the number of times that the second optimization process is performed and the number of times that the first optimization process is performed in the combined process.

10. The estimation system according to claim 1, wherein the first illumination light is light in the infrared range, and the second illumination light is light in the visible range.

11. The estimation system according to claim 1, wherein the first illumination light is light in the infrared range and satisfies the following condition (A):

$$2 \times \lambda 2 < \times 1 \tag{A}$$

where $\lambda 1$ is the wavelength of the first illumination light, and $\lambda 2$ is the wavelength of the second illumination light.

12. The estimation system according to claim 1, further comprising:
an angle changing mechanism,
wherein the angle changing mechanism changes an angle of incidence of the first illumination light on the object and an angle of incidence of the second illumination light on the object.

13. The estimation system according to claim 1, wherein:
the light sensor comprises first and second light sensors,
the stage is disposed in an optical path between the light source unit and the first light sensor, and
the stage is disposed in an optical path between the light source unit and the second light sensor.

14. The estimation system according to claim 13, wherein:
the first light sensor has a sensitivity equal to or higher than a first threshold to a wavelength band of the first illumination light, and does not have a sensitivity equal to or higher than the first threshold to a wavelength band of the second illumination light, and
the second light sensor has a sensitivity equal to or higher than a second threshold to the wavelength band of the second illumination light, and does not have a sensitivity equal to or higher than the second threshold to the wavelength band of the first illumination light.

15. The estimation system according to claim 13, further comprising:
a first optical element used with the first light sensor; and
a second optical element used with the second light sensor,
wherein:
the first optical element has characteristics that transmit the first illumination light and block the second illumination light, and
the second optical element has characteristics that transmit the second illumination light and block the first illumination light.

16. The estimation system according to claim 1, wherein:
the light source unit comprises a plurality of independent light sources having different illumination angles, and
the light sources are controllable to turn emission of illumination light on and off, whereby an angle of incidence of the first illumination light on the object and an angle of incidence of the second illumination light on the object are changed.

17. The estimation system according to claim 1, further comprising:
an imaging optical system to form an optical image of the object;
a sensor to obtain an image of the object from the optical image of the object; and
a drive mechanism to change a distance between a location of the focal point of the imaging optical system and a location of the object along an optical axis direction of the imaging optical system,
wherein the illumination with the first illumination light and the illumination with the second illumination light are partial coherent illumination of the object.

18. An estimation method for estimating a three-dimensional optical property of an object placed on a stage, the stage being disposed in an optical path between a light source unit and a light sensor, the light source unit being configured to emit first illumination light and second illumination light, the method being executed under control of a hardware processor operatively coupled with a memory, and the method comprising:

performing an estimation process to estimate the three-dimensional optical property of the object placed on the stage, the three-dimensional optical property being a refractive index distribution or an absorbance distribution, wherein the estimation process comprises:

reading out first wave front information and second wave front information from the memory, the first wave front information being information on a wave front that is obtained by the light sensor based on the first illumination light that has passed through the object, the second wave front information being information on a wave front that is obtained by the light sensor based on the second illumination light that has passed through the object, and a wavelength at which an intensity of the second illumination light is highest being shorter than a wavelength at which an intensity of the first illumination light is highest;

a first optimization process that uses the first wave front information as a constraint, the first optimization process including a process of correcting estimated wave front information based on the first wave front information and the estimated wave front information; and a second optimization process that uses the second wave front information as a constraint, the second optimization process including a process of correcting the estimated wave front information based on the first wave front information and the estimated wave front information, and wherein the method comprises performing the first optimization process multiple times and performing the second optimization process multiple times.

19. A non-transitory computer-readable recording medium storing a program thereon, the program being executable by a hardware processor operatively coupled with a memory to perform an estimation process for estimating a three-dimensional optical property of an object placed on a stage, the three-dimensional optical property being a refractive index distribution or an absorbance distribution, the stage being disposed in an optical path between a light source unit and a light sensor, the light source unit being configured to emit first illumination light and second illumination light, and the program controlling the processor to execute processes comprising:

reading out first wave front information and second wave front information from the memory, and performing the estimation process using the first wave front information and the second wave front information, wherein:

the first wave front information is information on a wave front that is obtained by the light sensor based on the first illumination light that has passed through the object, the second wave front information is information on a wave front that is obtained by the light sensor based on the second illumination light that has passed through the object, a wavelength at which an intensity of the second illumination light is highest is shorter than a wavelength at which an intensity of the first illumination light is highest, the estimation process includes a first optimization process that uses the first wave front information as a constraint and a second optimization process that uses the second wave front information as a constraint, the first optimization process includes a process of correcting estimated wave front information based on the first wave front information and the estimated wave front information, the second optimization process includes a process of correcting the estimated wave front information based on the first wave front information and the estimated wave front information, and the performing the estimation process comprises performing the first optimization process multiple times and performing the second optimization process multiple times.

* * * * *